US012009623B2

(12) United States Patent
Uki

(10) Patent No.: US 12,009,623 B2
(45) Date of Patent: Jun. 11, 2024

(54) CONNECTOR WITH HEAT DISSIPATION MEMBER

(71) Applicant: Yazaki Corporation, Tokyo (JP)

(72) Inventor: Kazutaka Uki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 194 days.

(21) Appl. No.: 17/455,710

(22) Filed: Nov. 19, 2021

(65) Prior Publication Data

US 2022/0166174 A1 May 26, 2022

(30) Foreign Application Priority Data

Nov. 25, 2020 (JP) ................................ 2020-194778

(51) Int. Cl.

*H01R 24/66* (2011.01)
*H01R 13/52* (2006.01)
*H01R 13/629* (2006.01)

(52) U.S. Cl.

CPC ......... *H01R 24/66* (2013.01); *H01R 13/5202* (2013.01); *H01R 13/62938* (2013.01); *H01R 2201/26* (2013.01)

(58) Field of Classification Search

CPC ................ H01R 24/66; H01R 13/5202; H01R 13/62938; H01R 2201/26

See application file for complete search history.

(56) References Cited

U.S. PATENT DOCUMENTS

| | | | | |
|---|---|---|---|---|
| 7,070,449 | B2 * | 7/2006 | Miyazaki | H01R 13/521 439/736 |
| 8,011,976 | B2 * | 9/2011 | Ooki | H01R 13/521 439/736 |
| 8,414,330 | B2 | 4/2013 | Yamada | |
| 10,205,271 | B1 * | 2/2019 | Aoshima | H01R 13/502 |
| 10,454,199 | B1 * | 10/2019 | Christiano | H01R 13/424 |
| 10,644,462 | B2 * | 5/2020 | Shimizu | H01R 4/72 |
| 10,714,867 | B2 * | 7/2020 | Koyama | H01R 13/521 |
| 11,070,009 | B2 * | 7/2021 | Lee | H01H 85/0241 |
| 11,296,456 | B2 * | 4/2022 | Takagi | H01R 13/60 |
| 11,608,895 | B2 * | 3/2023 | Morello | F16J 15/3284 |
| 2019/0036270 | A1 | 1/2019 | Aoshima | |
| 2019/0322186 | A1 | 10/2019 | Arai | |

FOREIGN PATENT DOCUMENTS

JP 2011-204610 A 10/2011

* cited by examiner

*Primary Examiner* — Thanh Tam T Le
(74) *Attorney, Agent, or Firm* — Sughrue Mion, PLLC

(57) ABSTRACT

A connector includes a terminal fitting, an insulating housing having a terminal accommodation chamber in which the terminal fitting is accommodated, and attached to a casing of an installation target device, and an insulating heat dissipation member that takes heat from the terminal fitting and dissipates the heat are included, and the heat dissipation member includes a heat absorbing portion that comes into contact with the terminal fitting in the terminal accommodation chamber and takes heat from the terminal fitting, and a heat transfer portion that transfers the heat taken by the heat absorbing portion to a heat transfer target portion outside the terminal accommodation chamber.

14 Claims, 16 Drawing Sheets

CONNECTOR WITH HEAT DISSIPATION MEMBER

CROSS-REFERENCE TO RELATED APPLICATION(S)

The present application claims priority to and incorporates by reference the entire contents of Japanese Patent Application No. 2020-194778 filed in Japan on Nov. 25, 2020.

BACKGROUND OF THE INVENTION

1. Field of the Invention

The present invention relates to a connector.

2. Description of the Related Art

In the related art, the connector is connected to the counterpart connector so that the terminal fittings can be in an energized state. This type of connector is disclosed in, for example, Japanese Patent Application Laid-open No. 2011-204610.

In the connector, the amount of heat generated at the terminal fitting or the electric wire increases as the current of the device to which the connector is connected increases. Therefore, in the conventional connector, an increase in temperature is suppressed by increasing the size of the terminal fitting, increasing the wire diameter of the electric wire, or the like. However, these measures are not necessarily preferable because the size of the connector is significantly increased.

SUMMARY OF THE INVENTION

Therefore, an object of the present invention is to provide a connector that suppresses an increase in temperature by enhancing heat dissipation performance.

In order to achieve the above mentioned object, a connector according to one aspect of the present invention includes a terminal fitting; an insulating housing having a terminal accommodation chamber in which the terminal fitting is accommodated, and attached to a casing of an installation target device; and an insulating heat dissipation member that takes heat from the terminal fitting and dissipates the heat, wherein the heat dissipation member includes a heat absorbing portion that comes into contact with the terminal fitting in the terminal accommodation chamber and takes heat from the terminal fitting, and a heat transfer portion that transfers the heat taken by the heat absorbing portion to a heat transfer target portion outside the terminal accommodation chamber.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
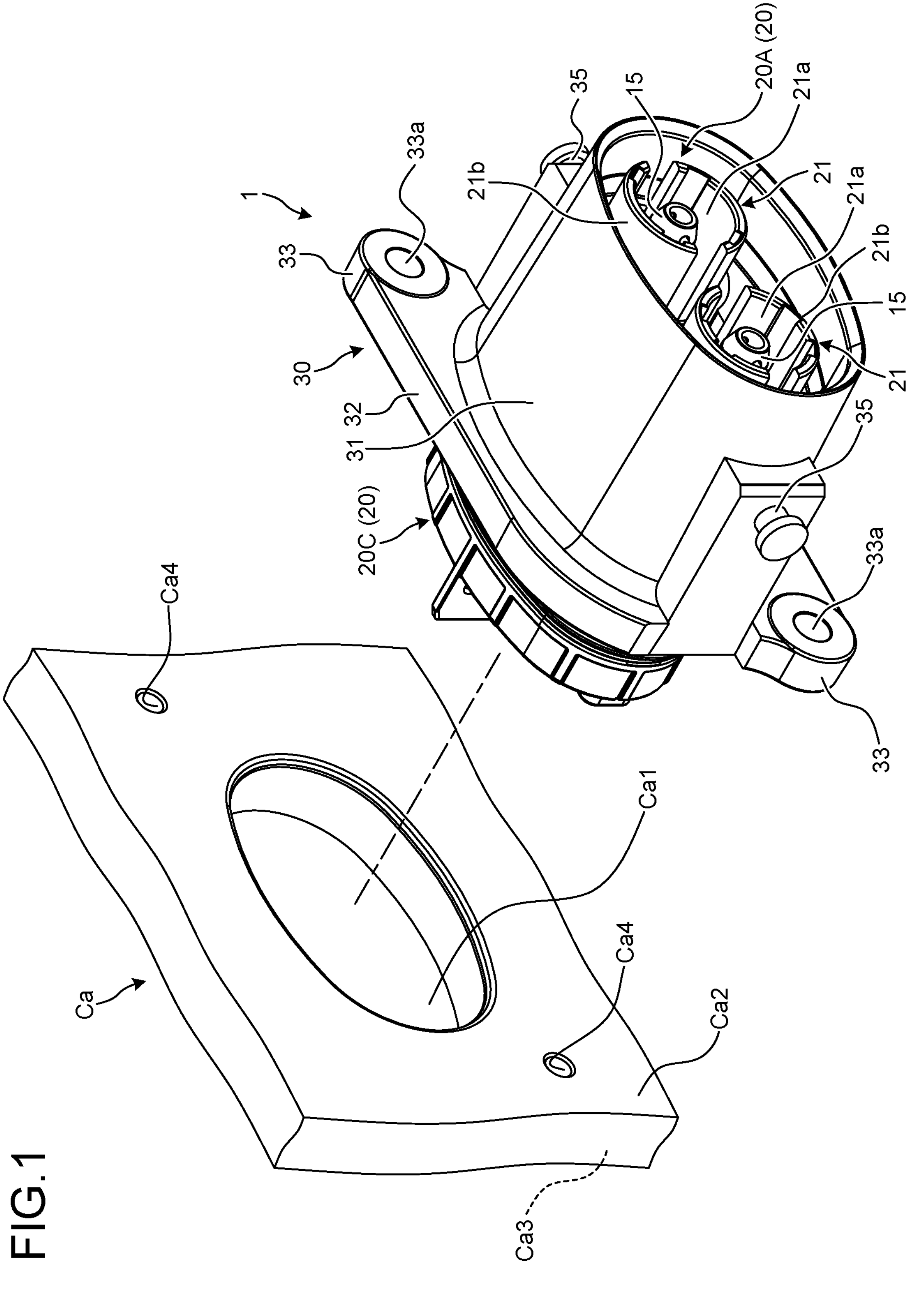
FIG. 1 is a perspective view of a connector, together with a casing of an installation target device, according to an embodiment before attachment.

Hereinafter, an embodiment of a connector according to the present invention will be described in detail with reference to the drawings. Note that the present invention is not limited by the embodiment.

EMBODIMENTS

One of the embodiments of a connector according to the present invention will be described with reference to FIGS. 1 to 10.

Reference numeral 1 in FIGS. 1 to 7 denotes a connector according to the present embodiment. The connector 1 is attached to a metal casing Ca (FIGS. 1 to 3) of an installation target device, and with a counterpart connector 501 (FIGS. 8 to 10) fitted and connected, electrically connect the installation target device and a device (not illustrated) ahead of the counterpart connector 501. For example, the connector 1 electrically connects a battery as an installation target device mounted on the vehicle and an inverter as a device, ahead of the counterpart connector 501, mounted on the vehicle.

Figure 2:
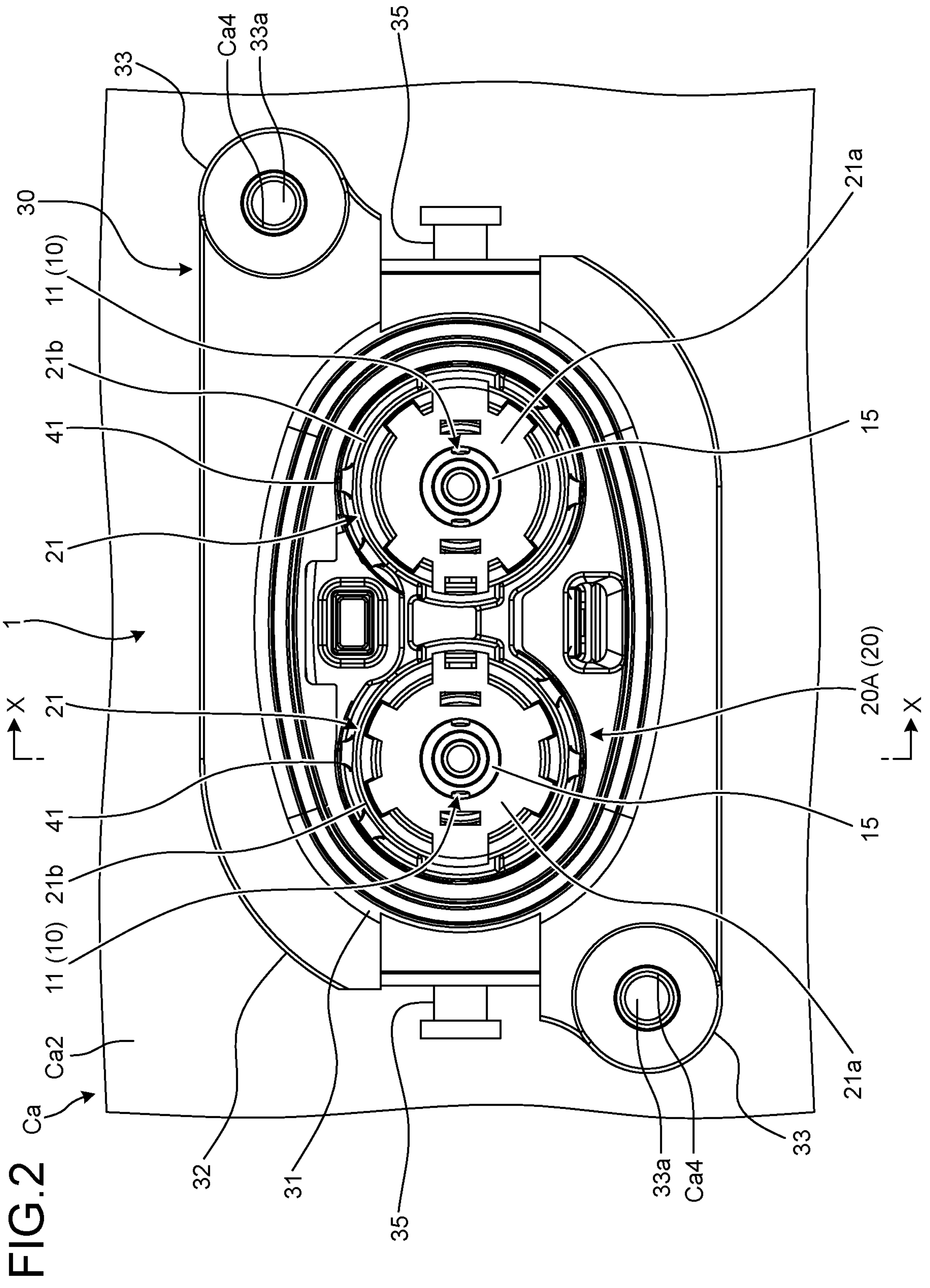
FIG. 2 is a plan view of the connector, together with the casing of the installation target device, according to the embodiment when viewed from a fitting portion.
Figure 4:
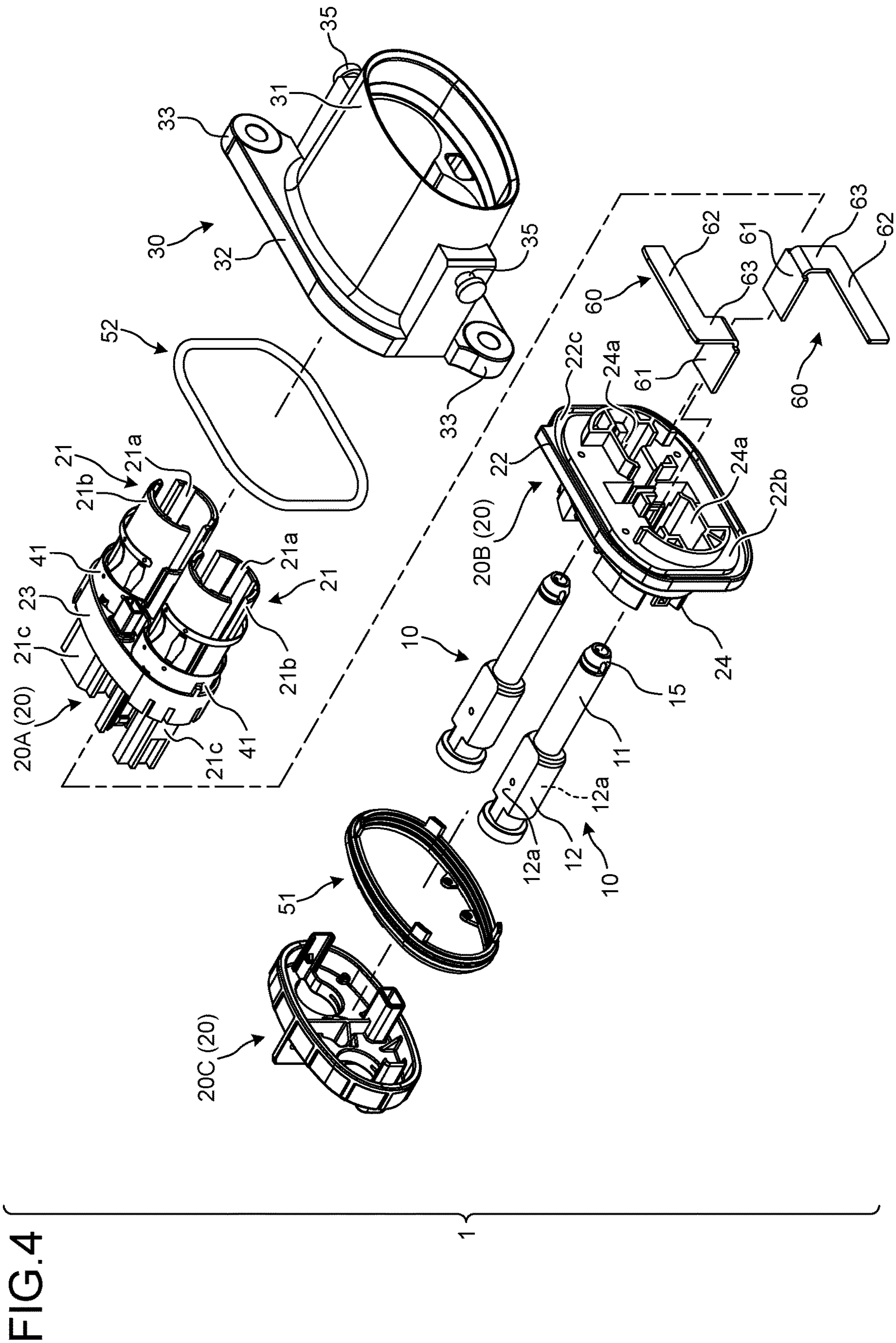
FIG. 4 is an exploded perspective view illustrating the connector of the embodiment.

The connector 1 includes a terminal fitting 10, a housing 20, and a shield shell 30 (FIGS. 2 and 4).

The terminal fitting 10 is formed of a conductive material such as metal. The terminal fitting 10 is physically and electrically connected to a counterpart terminal fitting 510 (FIG. 10) of the counterpart connector 501 by fitting and connecting the connector 1 and the counterpart connector 501. The terminal fitting 10 includes a terminal connection portion 11 which is physically and electrically connected to a counterpart terminal connection portion 511 (FIG. 10) of the counterpart terminal fitting 510, and an electric wire connection portion 12 which is physically and electrically connected to an end of an electric wire (not illustrated) (FIGS. 3 to 6).

For example, one of the terminal connection portion 11 and the counterpart terminal connection portion 511 is formed in a female terminal shape, and the other is formed in a male terminal shape. Here, the terminal connection portion 11 is formed in a cylindrical male terminal shape, and the counterpart terminal connection portion 511 is formed in a cylindrical female terminal shape into which the terminal connection portion 11 is fitted coaxially.

The terminal fitting 10 is formed as a straight-shaped terminal fitting in which the terminal connection portion 11 and the electric wire connection portion 12 are disposed on a straight line in the fitting connection direction with the counterpart terminal connection portion 511. In the terminal fitting 10 illustrated here, the electric wire connection portion 12 is formed in a cylindrical shape concentric with the terminal connection portion 11 and having an outer diameter larger than that of the terminal connection portion 11.

In addition, the terminal fitting 10 has an insulating anti-tactile portion 15 for preventing direct contact of fingers of an operator with the terminal connection portion 11 at a distal end portion (an end portion opposite to the electric wire connection portion 12) of the terminal connection portion 11 (FIGS. 1 to 6). The anti-tactile portion 15 is formed of an insulating material such as synthetic resin.

The connector 1 illustrated here includes two pairs of terminal fittings 10 and electric wires where the terminal fitting 10 and the electric wire compose a pair. The two pairs of terminal fittings 10 and the electric wires are disposed side by side with a distance with the respective terminal connection portions 11 having the same fitting connection direction.

Figure 3:
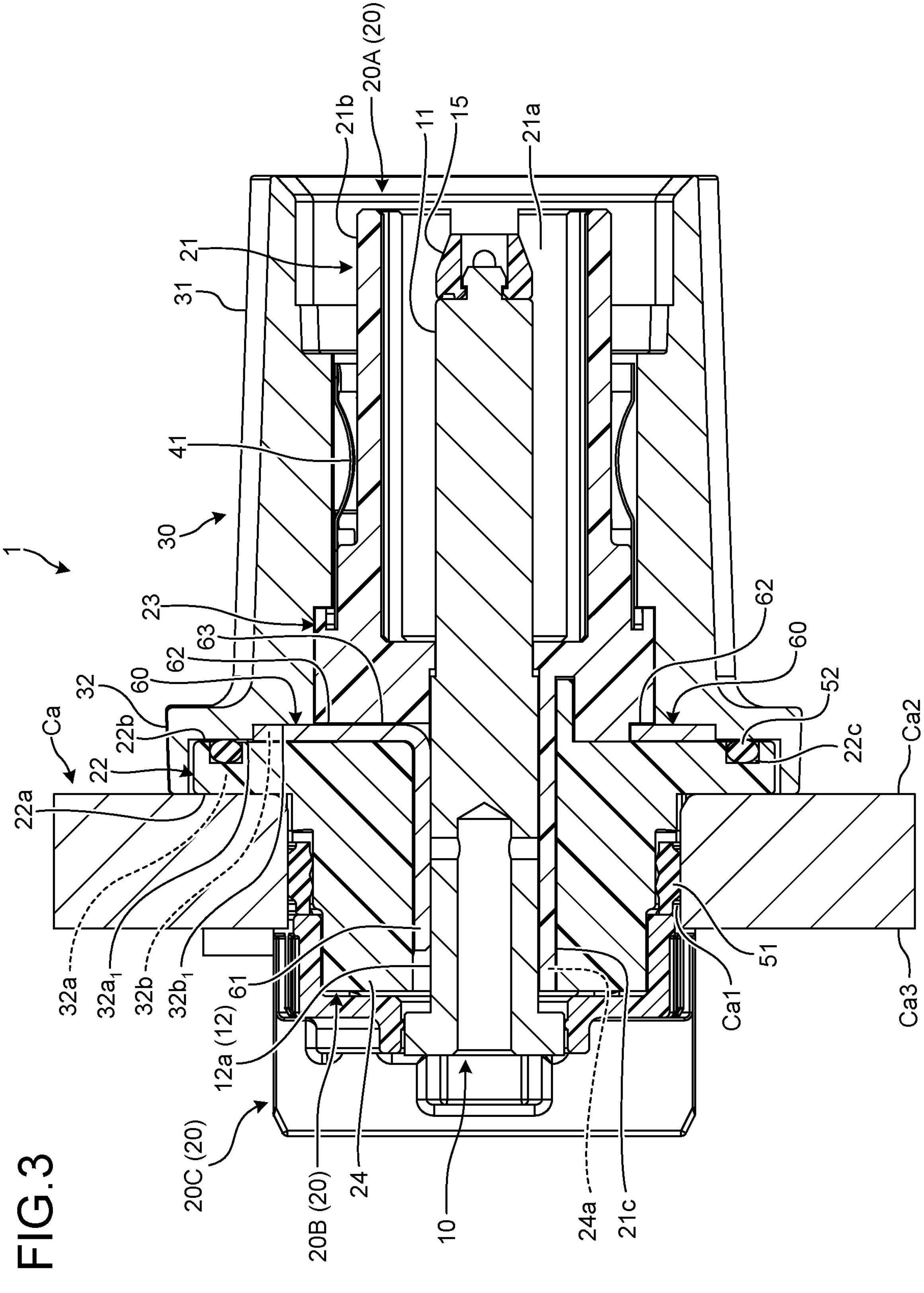
FIG. 3 is a cross-sectional view taken along line X-X of FIG. 2.

The housing 20 is formed of an insulating material such as synthetic resin and has an insulating property. The housing 20 is attached to the casing Ca of the installation target device. For example, the casing Ca has a through hole Ca1 that allows the inside and the outside of the casing Ca to communicate with each other (FIGS. 1 and 3). The through hole Ca1 is formed in, for example, an elliptical shape or an oval shape. The housing 20 is fitted into the through hole Ca1 in a state of projecting inward and outward of the casing Ca.

The housing 20 has a terminal accommodation chamber 21*a* in which the terminal fitting 10 is accommodated (FIGS. 1 to 4). The terminal accommodation chamber 21*a* is disposed from the inside to the outside of the casing Ca along the hole axis direction of the through hole Ca1 of the casing Ca. The terminal accommodation chamber 21*a* is formed to accommodate the terminal fitting 10 with the axial direction aligned with the hole axis direction of the through hole Ca1. The terminal accommodation chamber 21*a* is provided for each terminal fitting 10, and is disposed side by side in a direction orthogonal to the axial direction of the terminal fitting 10.

The housing 20 illustrated here has a tubular terminal accommodation portion 21 having the terminal accommodation chamber 21*a* therein for each terminal accommodation chamber 21*a* (FIGS. 1 to 4).

The terminal accommodation portion 21 is disposed in a state of projecting from a wall face Ca2, of the casing Ca, located at the outside, and has a fitting portion 21*b* to which a counterpart fitting portion 521*b* (FIG. 8) of a counterpart housing 520 of the counterpart connector 501 is fitted (FIGS. 1 to 4). That is, the fitting portion 21*b* has part of the terminal accommodation chamber 21*a* therein. The terminal connection portion 11 is accommodated in the terminal accommodation chamber 21*a* toward the fitting portion 21*b*. Therefore, by fitting and connecting the counterpart fitting portion 521*b*, the fitting portion 21*b* fits and connects the counterpart terminal connection portion 511 to the terminal connection portion 11 in the terminal accommodation chamber 21*a* inside the fitting portion 21*b*. The fitting portion 21*b* illustrated here is formed in a cylindrical shape.

An elastic member 41 having an arc shape concentric with the outer peripheral face thereof and capable of being elastically deformed in the radial direction is assembled to the fitting portion 21*b* (FIGS. 2 to 4). The elastic member 41 applies a resilient force accompanying elastic deformation to the outer peripheral face of a cylindrical counterpart shield shell 530 (FIG. 10) of the counterpart connector 501 inserted between the outer peripheral face of the fitting portion 21*b* and the elastic member.

Further, the terminal accommodation portion 21 has a projecting portion from a wall face Ca3 of the casing Ca toward the inside as a rectangular cylindrical portion 21*c* (FIGS. 3 and 4). The electric wire connection portion 12 is accommodated in the terminal accommodation chamber 21*a* toward the cylindrical portion 21*c*.

Further, the housing 20 has an annular flange portion 22 in which part of the terminal accommodation chamber 21*a* is disposed (FIGS. 3 to 6). The flange portion 22 has a first annular face 22*a* in the axial direction coming into contact with the wall face Ca2 of the casing Ca at the peripheral edge of the through hole Ca1 (FIG. 3).

The housing 20 illustrated here includes a first housing member 20A having the terminal accommodation portion 21 and a second housing member 20B having the flange portion 22 and assembled to the first housing member 20A (FIGS. 3 and 4). Therefore, the first housing member 20A has the terminal accommodation chamber 21*a*, the fitting portion 21*b*, and the cylindrical portion 21*c*.

The first housing member 20A has a base portion 23 that integrates the two terminal accommodation portions 21 at the outer periphery thereof (FIGS. 3 and 4). The base portion 23 in which part of the two terminal accommodation portions 21 is disposed toward the fitting portion 21*b* relative to the flange portion 22 has an elliptical or oval columnar body at the outer periphery of the two terminal accommodation portions 21. In the first housing member 20A, with the base portion 23 as a starting point, the fitting portions 21*b* of the two terminal accommodation portions 21 project to one side, and the cylindrical portions 21*c* of the two terminal accommodation portions 21 project to the other side.

Figure 5:
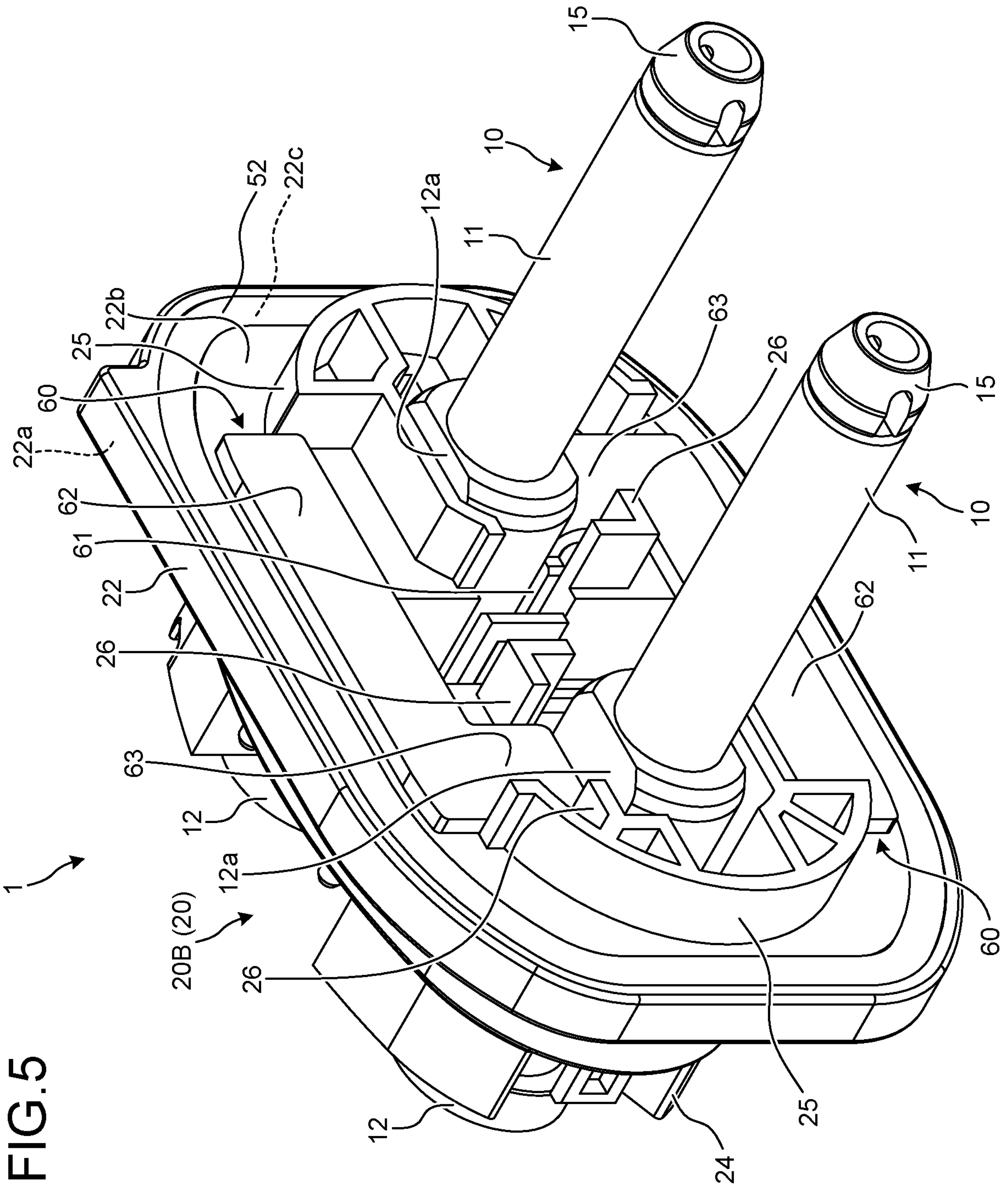
FIG. 5 is a perspective view illustrating a main part of a heat dissipation member of the connector according to the embodiment.

The second housing member 20B covers the cylindrical portions 21*c* of the two terminal accommodation portions 21 from the outside in the assembled state of the first housing member 20A. The second housing member 20B has a base portion 24 part of which is disposed in the through hole Ca1 of the casing Ca and that extends from the inside to the outside of the casing Ca, and the flange portion 22 provided at a projecting portion of the base portion 24 at the outside of the casing Ca (FIGS. 3 to 5). The base portion 24 is formed such that its main body forms an elliptical or oval columnar body. The base portion 24 has a through hole 24*a* into which each cylindrical portion 21*c* is inserted (FIGS. 3 and 4). In addition, the flange portion 22 is formed as an angular annular flat plate whose inner peripheral edge has an elliptical shape or an oval shape and whose outer peripheral edge has a rectangular shape.

The housing 20 further includes a lid-like third housing member 20C that covers the base portion 24 of the second housing member 20B from the projecting portion at the inside of the casing Ca (FIGS. 1, 3, and 4). An annular sealing member 51 with which a gap with the inner peripheral face of the through hole Ca1 of the casing Ca is filled is assembled to the outer peripheral face of the base portion 24 (FIGS. 3 and 4). In order to maintain the assembled state of the sealing member 51, the third housing member 20C locks the sealing member 51 in the axial direction along with the assembly to the base portion 24.

The shield shell 30 prevents noise from entering the terminal fitting 10 at the outside of the casing Ca, and is formed of a metal material. The metal shield shell 30 includes a tubular shield portion 31 that accommodates the fitting portions 21*b* and the base portion 23 in the first housing member 20A, a shield flange portion 32 that holds the flange portion 22 between the shield flange portion and the wall face Ca2 of the casing Ca from a second annular face 22*b* in the axial direction, and a fixing portion 33 that fixes the shield flange portion 32 to the casing Ca (FIGS. 1, 2, 4, and 7).

The tubular shield portion 31 is formed as an elliptical or oval cylindrical body.

Figure 7:
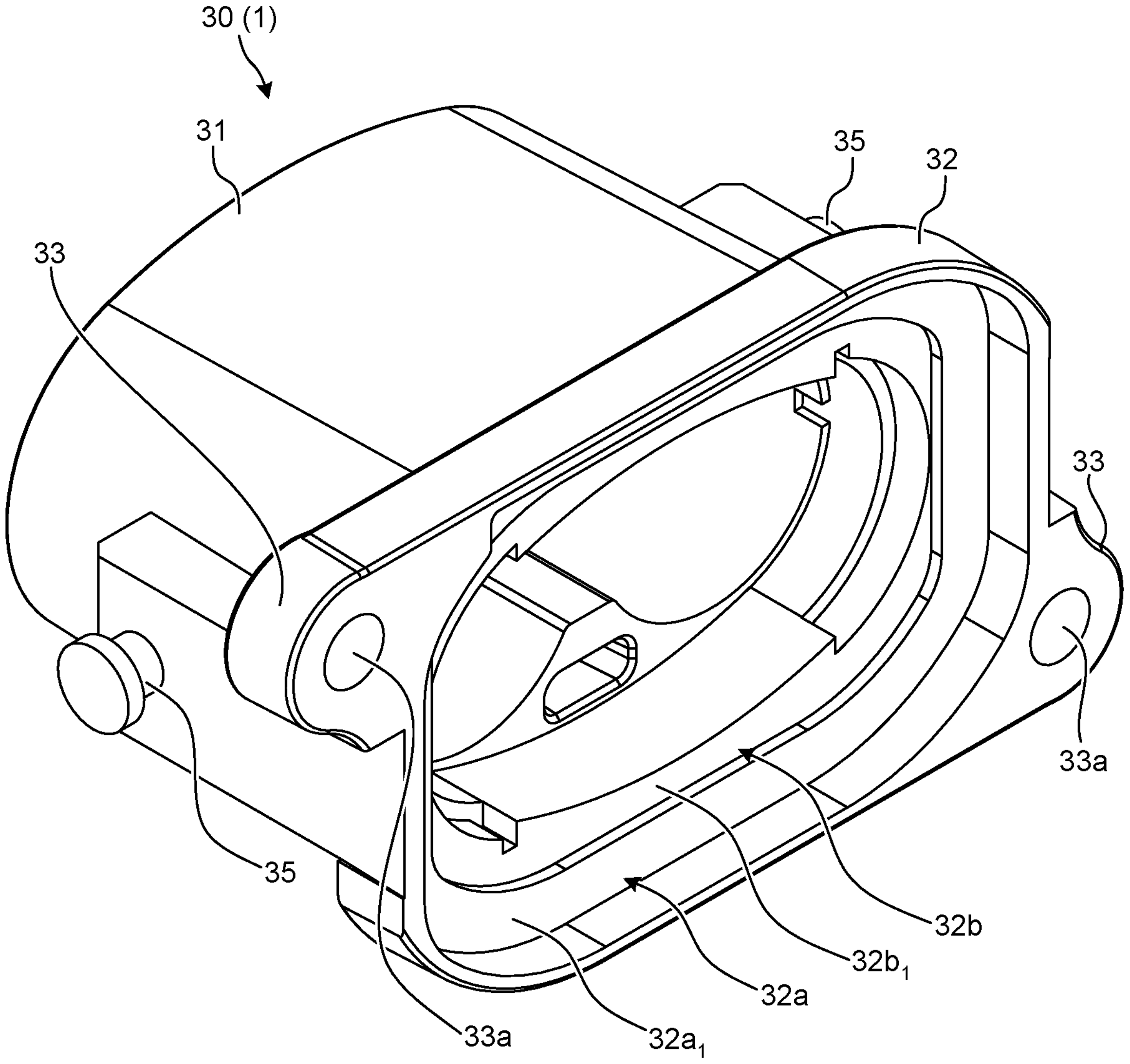
FIG. 7 is a perspective view illustrating a shield shell.

The shield flange portion 32 is formed as a flat plate disposed outward of the outer peripheral face of the tubular shield portion 31 in the radial direction. The shield flange portion 32 has a recess 32*a* having the same shape as the flange portion 22 and accommodating the flange portion 22 therein (FIGS. 3 and 7). Here, a wall face 32*ai* of the recess 32*a* is disposed to face the second annular face 22*b* of the flange portion 22. The flange portion 22 has an annular seal groove 22*c* into which an annular sealing member 52 is fitted at the wall face, of the second annular face 22*b*, facing the wall face 32*ai* of the recess 32*a* with the sealing member projecting from the facing wall face (FIGS. 3 and 4). The sealing member 52 is crushed between the groove bottom of the seal groove 22*c* and the wall face 32*ai* of the recess 32*a* of the shield flange portion 32 to improve liquid tightness therebetween.

The fixing portion 33 is a piece portion projecting from the shield flange portion 32 on the same plane, and has a through hole 33*a* for screw fixing (FIGS. 1, 2, and 7). Here, the casing Ca has a female screw portion Ca4 (FIGS. 1 and 2), and a male screw member (not illustrated) is screwed into the female screw portion Ca4 via the through hole 33*a*, thereby fixing the shield shell 30 to the casing Ca via the fixing portion 33. Here, the fixing portions 33 are provided at two positions. The sealing member 52 is crushed between the groove bottom of the seal groove 22*c* and the wall face 32*ai* of the shield flange portion 32 by screwing and fixing the two fixing portions 33 to the casing Ca.

Here, in the connector 1, since the terminal fitting 10 is held by the housing 20, heat of the terminal fitting 10 due to energization is transferred to the housing 20. The heat of the housing 20 is transferred to the casing Ca via the sealing member 51 or the surrounding air, or is transferred to the shield shell 30 via the sealing member 52 or the surrounding air, for example. Therefore, in the connector 1, the heat generation amount of the terminal fitting 10 increases as the current of the installation target device increases, and thus there is a possibility that the heat of the terminal fitting 10 cannot be released well with this configuration. In addition, in the connector 1, the heat of the terminal fitting 10 can be transferred to the electric wire, but since the amount of heat generated by the electric wire increases as the current of the installation target device increases, there is a possibility that the heat of the terminal fitting 10 cannot be released to the electric wire.

Therefore, the connector 1 has an insulating heat dissipation member 60 that takes heat from the terminal fitting 10 and dissipates the heat (FIGS. 3 to 6). The heat dissipation member 60 is provided for each terminal fitting 10.

The heat dissipation member 60 is formed of a raw material having a higher thermal conductivity than a raw material of the housing 20 in order to enhance the heat absorption efficiency from the terminal fitting 10 than the housing 20. For example, the heat dissipation member 60 is formed using fine ceramics such as aluminum nitride as a raw material.

The heat dissipation member 60 includes a heat absorbing portion 61 that comes into contact with the terminal fitting 10 in the terminal accommodation chamber 21*a* and takes heat from the terminal fitting 10, and a heat transfer portion 62 that transfers the heat taken by the heat absorbing portion 61 to a heat transfer target portion outside the terminal accommodation chamber 21*a* (FIGS. 3 to 6). In the heat dissipation member 60 illustrated here, the heat absorbing portion 61 and the heat transfer portion 62 are each formed in a rectangular flat plate shape.

The heat absorbing portion 61 is disposed at a position that does not interfere with the fitting connection between the terminal connection portion 11 and the counterpart terminal connection portion 511. Therefore, the heat absorbing portion 61 is disposed in the terminal accommodation chamber 21*a* toward the cylindrical portion 21*c*, and comes into contact with the terminal fitting 10 in the terminal accommodation chamber 21*a* toward the cylindrical portion 21*c*.

Figure 6:
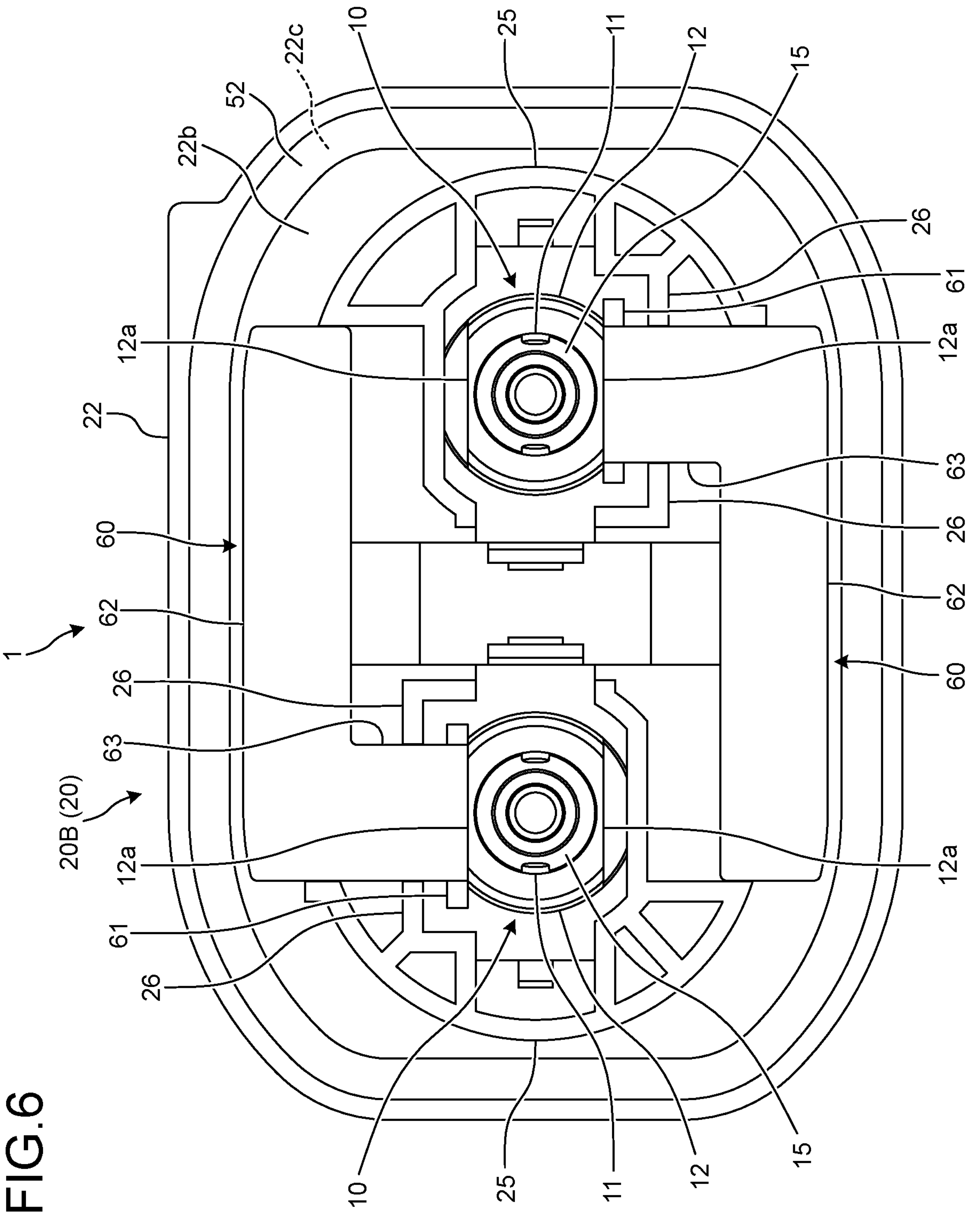
FIG. 6 is a plan view of the main part of the heat dissipation member of the connector according to the embodiment when viewed from the viewpoint of FIG. 2.

For example, the heat absorbing portion 61 comes into contact with the exterior wall face of the terminal fitting 10 along the extending direction of the terminal fitting 10 and the terminal accommodation chamber 21*a*. The heat absorbing portion 61 illustrated here is provided to come into contact with the electric wire connection portion 12 of the terminal fitting 10 to take heat from the terminal fitting 10 from the electric wire connection portion 12. For example, the electric wire connection portion 12 illustrated here has planar exterior wall faces 12*a* parallel to each other on the outer peripheral face (FIGS. 3 to 6). The heat absorbing portion 61 takes heat from the terminal fitting 10 by bringing one plane thereof into surface contact with an exterior wall face 12*a* of the electric wire connection portion 12 (FIGS. 3, 5, and 6). In the connector 1 illustrated here, the two terminal fittings 10 are accommodated in the respective terminal accommodation chambers 21*a* with the respective exterior wall faces 12*a* facing in a direction orthogonal to the parallel direction of the two terminal fittings 10 and the axial direction of the terminal fittings 10. In the one terminal fitting 10, the heat absorbing portion 61 comes into contact with the exterior wall face 12*a* in the orthogonal direction. In the other terminal fitting 10, the heat absorbing portion 61 comes into contact with the other exterior wall face 12*a* in the orthogonal direction.

The heat transfer portion 62 is disposed between the flange portion 22 of the housing 20 and the shield flange portion 32 of the shield shell 30, and transfers heat to the shield flange portion 32 at least by coming into contact with the shield flange portion 32. That is, in the connector 1, part of the shield shell 30 is used as a heat transfer target portion to which heat of the heat transfer portion 62 is transferred outside the terminal accommodation chamber 21*a*. However, the heat transfer target portion may be part of a member other than the shield shell 30 depending on the configuration of the connector 1, or may be the atmosphere such as air in contact with the heat transfer portion 62.

The connector 1 has a heat transfer chamber 32*b* that accommodates the heat transfer portion 62 between the flange portion 22 and the shield flange portion 32 with the heat transfer portion 62 coming into contact with the shield flange portion 32, and that transfers heat of the heat transfer portion 62 to at least the shield flange portion 32 (FIGS. 3 and 7). The heat transfer chamber 32*b* is an annular recess further recessed from the recess 32*a* at the inner peripheral face of the tubular shield portion 31 at the shield flange portion 32, and is formed as an annular space with a wall face, toward the base portion 24, of the second annular face 22*b* of the flange portion 22 locked to the wall face 32*ai* of the recess 32*a*. In the heat transfer chamber 32*b*, by bringing one plane of the heat transfer portion 62 into surface contact with a facing wall face $32b_1$ facing the second annular face 22*b*, heat of the heat transfer portion 62 is transferred to the shield flange portion 32 (FIG. 3). Therefore, the heat of the heat transfer portion 62 is dissipated to the surrounding air by the shield shell 30, or transferred to the casing Ca through the shield shell 30 and dissipated from the casing Ca to the surrounding air.

In the heat transfer chamber 32*b* illustrated here, by holding the heat transfer portion 62 by the shield flange portion 32 and the flange portion 22, one plane of the heat transfer portion 62 comes into surface contact with the facing wall face $32b_1$ of the shield flange portion 32, and the other plane of the heat transfer portion 62 comes into surface contact with the second annular face 22*b* of the flange portion 22. For this reason, for example, the heat transfer chamber 32*b* adjusts the recess amount of the annular recess such that the sealing member 52 is elastically deformed between the groove bottom of the seal groove 22*c* of the flange portion 22 and the wall face 32*ai* of the shield flange portion 32 without bringing the second annular face 22*b* of the flange portion 22 into contact with the wall face 32*ai* of the recess 32*a* of the shield flange portion 32 when the heat transfer portion 62 is held. As a result, the heat of the heat transfer portion 62 is further transferred to the flange portion 22.

The heat transfer portion 62 illustrated here is disposed on the long side portion of each of the flange portion 22 and the shield flange portion 32 in the heat transfer chamber 32*b*. Accordingly, the heat transfer portion 62 can extend in the parallel direction (that is, in the longitudinal direction of the flange portion 22 and the shield flange portion 32) of the two terminal fittings 10. Therefore, since the contact area of the heat transfer portion 62 with the flange portion 22 and the shield flange portion 32 can be increased, the heat transfer efficiency to these portions can be enhanced.

The heat transfer chamber 32*b* is formed with a wall face, of the second annular face 22*b* of the flange portion 22, inward of the seal groove 22*c*. Therefore, in the connector 1, the heat transfer portion 62 can be disposed inward of the sealing member 52 regardless of the arrangement of the sealing member 52. Therefore, in the connector 1, it is possible to suppress a reduction in waterproof performance due to the provision of the heat dissipation member 60.

The heat dissipation member 60 illustrated here includes a coupling portion 63 that couples the heat absorbing portion 61 and the heat transfer portion 62 (FIGS. 3 to 6). The coupling portion 63 is formed in a rectangular flat plate shape on the same plane as the heat transfer portion 62.

The heat dissipation member 60 is held by the housing 20, for example.

The second housing member 20B illustrated here has a plurality of protrusions (hereinafter, referred to as a "first protrusion") 25 projecting from the second annular face 22*b* of the flange portion 22, and the heat transfer portion 62 is held by the housing 20 by being held between the two first protrusions 25 disposed to face each other with a distance therebetween (FIGS. 5 and 6). Here, at each short side of the flange portion 22, one first protrusion 25 having a half-arc shape is disposed so as to protrude outward in the parallel direction of the two terminal fittings 10. In the two first protrusions 25, one end portions of the respective outer peripheral faces in the circumferential direction are disposed with a distance equivalent to the length of the heat transfer portion 62 in the extending direction at one long side of the flange portion 22, and the other end portions of the respective outer peripheral faces in the circumferential direction are disposed with a distance equivalent to the length of the heat transfer portion 62 in the extending direction at the other long side of the flange portion 22. Therefore, the one heat dissipation member 60 is held by the housing 20 when the heat transfer portion 62 is held between respective one end portions of the two first protrusions 25. The other heat dissipation member 60 is held by the housing 20 when the heat transfer portion 62 is held between respective the other end portions of the two first protrusions 25.

Furthermore, the second housing member 20B illustrated here has two protrusions (hereinafter, referred to as a "second protrusion") 26 projecting from the second annular face 22*b* of the flange portion 22 for each heat dissipation member 60 between the two first protrusions 25, and the coupling portion 63 is held by the housing 20 when held by the two second protrusions 26 (FIGS. 5 and 6).

Note that the heat dissipation member 60 may be held between the first housing member 20A and the second housing member 20B. For example, in the connector 1, the heat transfer portion 62 and the coupling portion 63 of the heat dissipation member 60 are disposed between the base portion 23 of the first housing member 20A and the second annular face 22*b* of the flange portion 22 of the second housing member 20B. Therefore, the heat dissipation member 60 may be held by the housing 20 when the heat transfer portion 62 and the coupling portion 63 are held between the base portion 23 and the second annular face 22*b* of the flange portion 22.

As described above, in the connector 1, the heat of the terminal fitting 10 is transferred to the housing 20, transferred to the casing Ca and the shield shell 30 via the housing 20, and dissipated to the surrounding air. In addition, in the connector 1, the heat of the terminal fitting 10 transferred to the shield shell 30 is dissipated to the surrounding air via the counterpart housing 520 covering the tubular shield portion 31 from the outside. Furthermore, in the connector 1, when the temperature of the electric wire is lower, the heat of the terminal fitting 10 is transferred to the electric wire. The connector 1 of the present embodiment has a heat transfer path via the heat dissipation member 60 in addition to the same heat transfer path as the conventional one. Therefore, the connector 1 of the present embodiment can improve the heat dissipation performance of the terminal fitting 10 as compared with that of the related art, and can suppress the high temperature of the terminal fitting 10, so that it is possible to cope with an increase in current.

In a case where the casing Ca includes a cooling structure or a cooling mechanism that cools the casing Ca, by cooling the casing Ca with the cooling structure or the like, it is easy for the casing Ca to take heat from the terminal fitting 10 transferred to the casing Ca via or without via the heat dissipation member 60. For example, the cooling structure and the cooling mechanism may be of an air-cooling type in which surrounding air is forcibly applied to the casing Ca or a surface area of the casing Ca exposed to the surrounding air is expanded by fins or the like. In addition, the cooling structure and the cooling mechanism may be of a water-cooling type in which flowing water is directly or indirectly applied to the surface of the casing Ca to cause the water to take heat from the casing Ca, or water is caused to flow to a water passage in a wall of the casing Ca to cause the water to take heat from the casing Ca. Therefore, in the connector 1, when the casing Ca includes the cooling structure or the like, more heat of the terminal fitting 10 can be taken away by the casing Ca cooled by the cooling structure or the like, so that the heat dissipation performance of the terminal fitting 10 can be further enhanced. Therefore, in the connector 1, it is possible to further cope with an increase in current.

Further, the heat dissipation member 60 is accommodated in the connector by using a gap between the heat dissipation member and the terminal fitting 10 in the terminal accommodation chamber 21*a* or using a chamber including a recess formed between the flange portion 22 and the shield flange portion 32. Therefore, the connector 1 of the present embodiment can enhance the heat dissipation performance of the terminal fitting 10 as compared with that of the related art while suppressing an increase in size, so that it is possible to cope with an increase in current while maintaining the same size as that of the related art.

Furthermore, the heat transfer portion 62 of the heat dissipation member 60 is disposed at a place not related to the arrangement of the sealing member 52, that is, inside the sealing member 52. Therefore, the connector 1 of the present embodiment can enhance the heat dissipation performance of the terminal fitting 10 as compared with that of the related art without adversely affecting the waterproof property, so that it is possible to cope with an increase in current while maintaining the waterproof property equivalent to that of the related art.

Furthermore, the arrangement of the heat dissipation member 60 can be completed inside the shield shell 30. Therefore, the connector 1 of the present embodiment can enhance the heat dissipation performance of the terminal fitting 10 as compared with that of the related art without adversely affecting the shielding performance, so that it is possible to cope with an increase in current while maintaining the shielding performance equivalent to that of the related art.

Here, the counterpart connector 501 will be briefly described.

Figure 10:
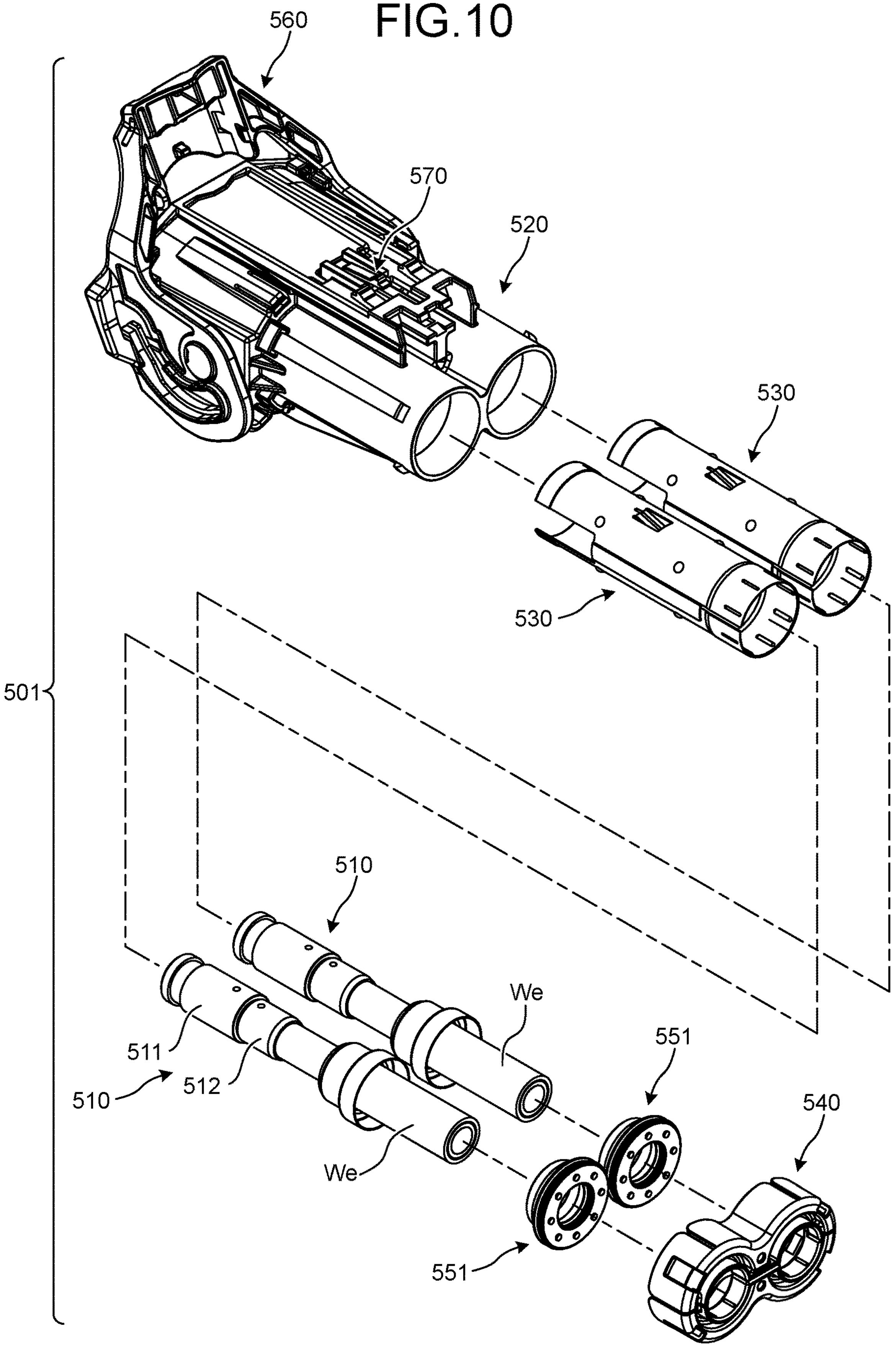
FIG. 10 is an exploded perspective view illustrating the counterpart connector.

As described above, the counterpart connector 501 includes the counterpart terminal fitting 510, the counterpart housing 520, and the counterpart shield shell 530 (FIG. 10).

The counterpart terminal fitting 510 is formed of a conductive material such as metal. The counterpart terminal fitting 510 includes the counterpart terminal connection portion 511 having the cylindrical female terminal shape described above and a counterpart electric wire connection portion 512 to be physically and electrically connected to the end of an electric wire We (FIG. 10). The counterpart electric wire connection portion 512 is physically and electrically connected to the electric wire We by, for example, crimping or welding the core wire of the end of the electric wire We. The electric wire We illustrated here is a so-called shield electric wire.

The counterpart terminal fitting 510 is formed as a straight shape in which the counterpart terminal connection portion 511 and the counterpart electric wire connection portion 512 are disposed on a straight line in the fitting connection direction with the terminal connection portion 11.

The counterpart connector 501 includes two pairs of counterpart terminal fittings 510 and electric wires We where the counterpart terminal fitting 510 and the electric wire We compose a pair. The two pairs of the counterpart terminal fittings 510 and the electric wires We are disposed side by side with a distance with the respective counterpart terminal connection portions 511 having the same fitting connection direction.

Figure 8:
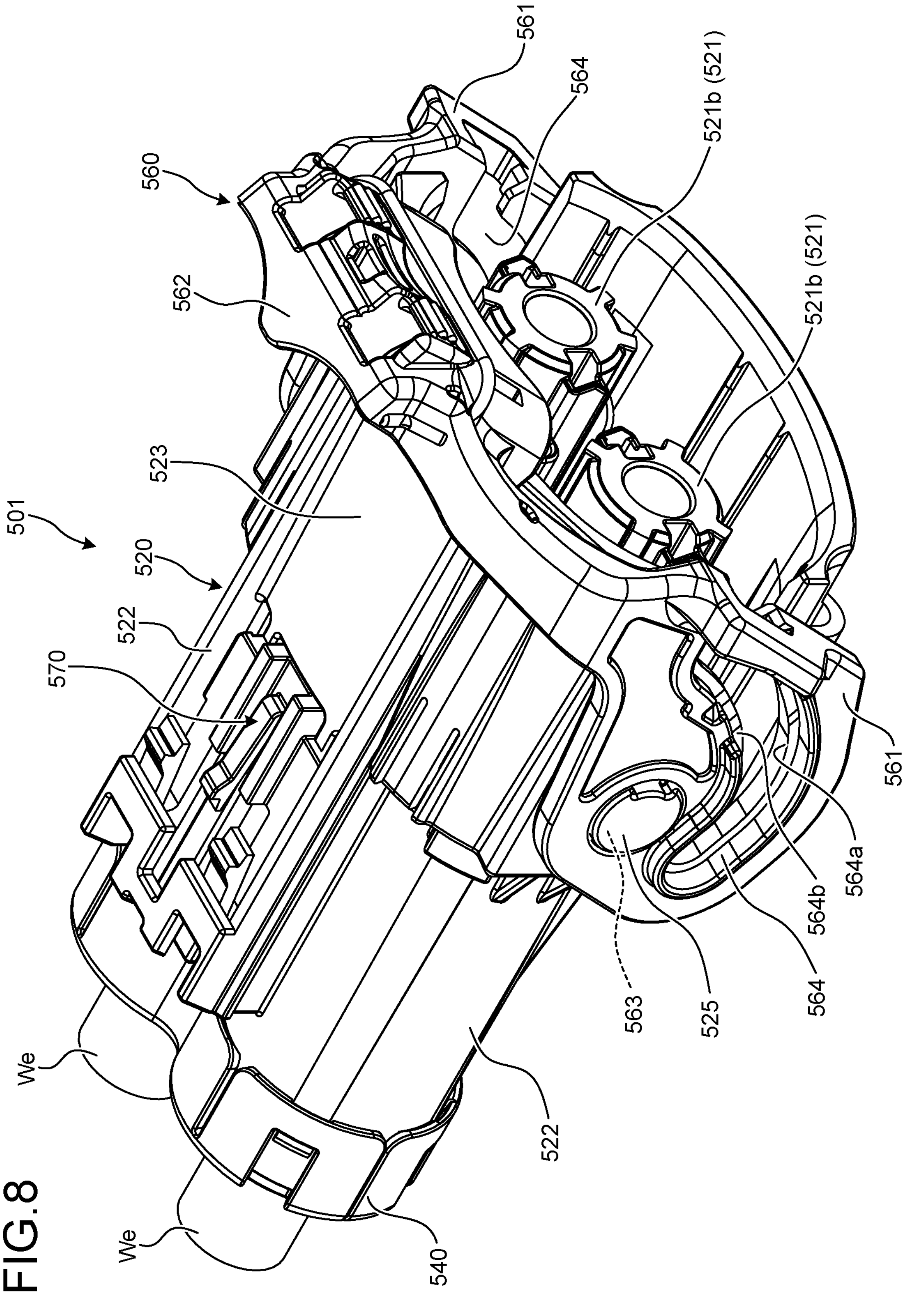
FIG. 8 is a perspective view illustrating the connector, together with a counterpart connector, according to the embodiment before fitting connection.

The counterpart housing 520 is formed of an insulating material such as synthetic resin and has an insulating property. The counterpart housing 520 includes a cylindrical terminal accommodation portion 521 for each counterpart terminal fitting 510 in which the counterpart terminal fitting 510 is accommodated, and a cylindrical electric wire accommodation portion 522 for each electric wire We in which the electric wire We pulled out from the counterpart terminal fitting 510 is accommodated (FIG. 8).

The distal end of the terminal accommodation portion 521 is used as the counterpart fitting portion 521*b* to be fitted to the fitting portion 21*b* of the connector 1. The counterpart fitting portion 521*b* is fitted into the cylindrical fitting portion 21*b*, and the terminal connection portion 11 inside the fitting portion 21*b* is inserted into the counterpart fitting portion 521*b*, thereby fitting and connecting the terminal connection portion 11 inside the counterpart terminal connection portion 511.

In the counterpart housing 520, the inner diameter of the electric wire accommodation portion 522 is larger than the outer diameter of the terminal accommodation portion 521, and the end portion of the terminal accommodation portion 521 toward the electric wire accommodation portion 522 is inserted into the end portion of the electric wire accommodation portion 522 toward the terminal accommodation portion 521. The counterpart shield shell 530 is formed in a cylindrical shape using a metal material, and accommodates the accommodation position of the counterpart terminal connection portion 511 in the terminal accommodation portion 521 therein and accommodates the counterpart terminal connection portion 511 inside the electric wire accommodation portion 522. That is, the counterpart shield shell 530 prevents noise from entering the counterpart terminal fitting 510 and the electric wire We by accommodating the counterpart terminal fitting 510 to the electric wire We therein.

In the electric wire accommodation portion 522, an annular sealing member 551 with which an annular gap between the inner peripheral face of the sealing member and the electric wire We is filled is disposed at an end portion on a side where the electric wire We is drawn outward (FIG. 10). Then, a rear holder 540 is assembled to the end portion of the electric wire accommodation portion 522 (FIGS. 8 and 10).

Further, the counterpart housing 520 has a cylindrical portion 523 that covers the two terminal accommodation portions 521 from the outside with a distance (FIG. 8). The cylindrical portion 523 is an elliptical or oval cylindrical body, and covers the tubular shield portion 31 from the outside by fitting the tubular shield portion 31 of the connector 1 into the cylindrical portion.

Figure 9:
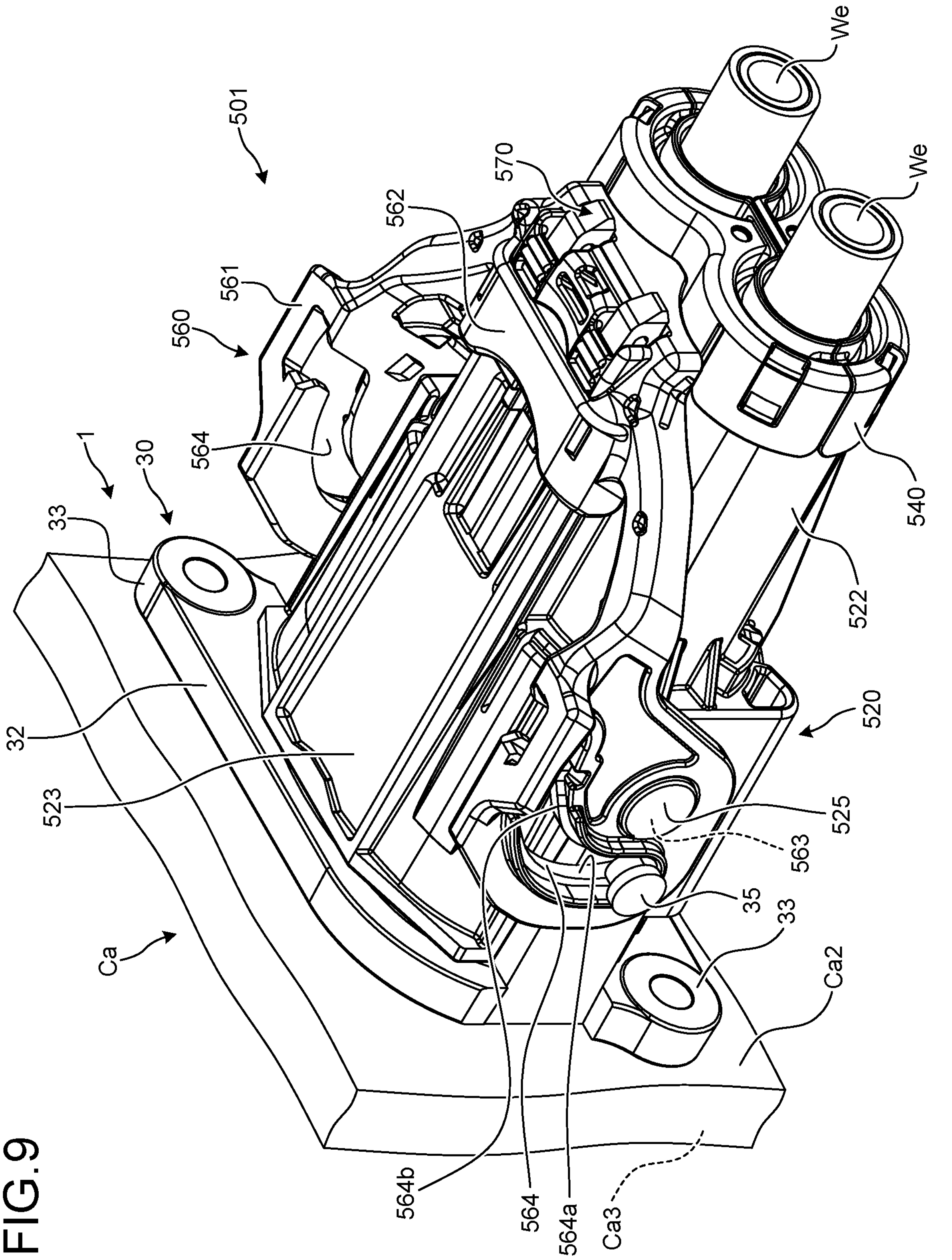
FIG. 9 is a perspective view illustrating the connector, together with the counterpart connector, according to the embodiment in a completely fitted state.

The counterpart connector 501 generates an assisting force of a fitting force and a removal force with respect to the connector 1 by a lever operation. Therefore, in the counterpart connector 501, a lever 560 is assembled to the counterpart housing 520 (FIGS. 8 to 10). The lever 560 includes two arms 561 disposed to face each other with a distance therebetween, and a coupling body 562 that couples one ends of the two arms 561 (FIGS. 8 and 9).

The lever 560 rotates relative to the counterpart housing 520 with the other ends of the two arms 561 as the rotation center. Therefore, the counterpart housing 520 has a rotation shaft 525 for each arm 561 (FIGS. 8 and 9). The two rotation shafts 525 are formed in a columnar shape or a cylindrical shape, and are provided in the counterpart housing 520 in a state of coaxially projecting in directions opposite to each other. A circular through hole 563 functioning as a bearing of the rotation shaft 525 is formed at the other end of each arm 561 (FIGS. 8 and 9). The lever 560 is rotatably attached to the rotation shaft 525 through the through hole 563.

When the connector 1 and the counterpart connector 501 are fitted and connected, the lever 560 is relatively rotated with respect to the counterpart housing 520 from a waiting position (FIG. 8) before the fitting connection toward a predetermined direction around the rotation shaft 525 to a fitting completion position (FIG. 9) after the fitting completion. On the other hand, when releasing the fitting connection state of the connector 1 and the counterpart connector 501, the lever 560 is relatively rotated from the fitting completion position to the waiting position with respect to the counterpart housing 520 in a direction opposite to that at the fitting connection time. The coupling body 562 has a function as an operation unit when the lever 560 is relatively rotated with respect to the counterpart housing 520.

Furthermore, each arm 561 of the lever 560 has a guide portion 564 having an arc shape and having a through hole 563 disposed at the inner side of the arc at the other end (FIGS. 8 and 9). In the connector 1, a guided portion 35 inserted into the guide portion 564 is provided for each guide portion 564 (FIGS. 1, 2, 4, and 7). The guided portion 35 is moved along an outer arc-shaped face 564*a* (FIGS. 8 and 9) or an inner arc-shaped face 564*b* (FIGS. 8 and 9) of the guide portion 564. When the connector 1 and the counterpart connector 501 are fitted and connected, the guide portion 564 illustrated here applies an assisting force to the connector 1 in the fitting connection direction by a force generated between the outer arc-shaped face 564*a* and the guided portion 35. On the other hand, when the fitting connection state between the connector 1 and the counterpart connector 501 is released, the guide portion 564 illustrated here applies an assisting force to the connector 1 in the fitting connection release direction (removal direction) by a force generated between the inner arc-shaped face 564*b* and the guided portion 35. In the connector 1 illustrated here, the guided portion 35 is provided on the shield shell 30. Each of the guided portions 35 is formed in a columnar shape or cylindrical shape, and is provided in the tubular shield portion 31 of the shield shell 30 in a state of coaxially projecting in directions opposite to each other.

When the lever 560 is relatively rotated with respect to the counterpart housing 520 in the rotation direction at the time of fitting connection, the outer peripheral face of the guided portion 35 comes into contact with the outer arc-shaped face 564*a* of the guide portion 564 to generate a force between the arc-shaped face 564*a* and the outer peripheral face while being slidably guided by the arc-shaped face 564*a*. Between the connector 1 and the counterpart connector 501, the force is transferred to the shield shell 30 and the counterpart housing 520 via each guided portion 35 and each arm 561, and the force is further transferred from the shield shell 30 to the housing 20 to act as an assisting force in the fitting connection direction. The outer arc-shaped face 564*a* of the guide portion 564 is formed to have a shape capable of generating such an assisting force.

On the other hand, when the lever 560 is relatively rotated with respect to the counterpart housing 520 in the rotation direction at the time of fitting connection release, the outer peripheral face of the guided portion 35 comes into contact with the inner arc-shaped face 564*b* of the guide portion 564, and a force is generated between the arc-shaped face 564*b* and the outer peripheral face while being slidably guided by the arc-shaped face 564*b*. Between the connector 1 and the counterpart connector 501, the force is transferred to the shield shell 30 and the counterpart housing 520 via each guided portion 35 and each arm 561, and the force is further transferred from the shield shell 30 to the housing 20 to act as an assisting force in a fitting connection release direction (removal direction). The inner arc-shaped face 564*b* of the guide portion 564 is formed to have a shape capable of generating such an assisting force.

The counterpart connector 501 includes a lever locking member 570 that suppresses the relative rotation of the lever 560 at the fitting completion position with the connector 1 (FIGS. 8 to 10). The lever locking member 570 relatively moves the counterpart housing 520 between a waiting position when the lever 560 is at the waiting position and a locking position when the lever 560 is at the fitting completion position. For example, the lever locking member 570 is hooked on the coupling body 562 of the lever 560 at the fitting completion position at the locking position, and is locked so that the lever 560 does not relatively rotate from the fitting completion position to the waiting position.

[Modification]

Next, a modification of the connector according to the present invention will be described with reference to FIGS. 11 to 16.

Reference numeral 2 in FIGS. 11 to 14 denotes a connector of the present modification. As in the connector 1 of the above-described embodiment, the connector 2 is attached to the metal casing Ca of the installation target device, and the counterpart connector 501 is fitted and connected to electrically connect the installation target device and a device (not illustrated) ahead of the counterpart connector 501.

Figure 11:
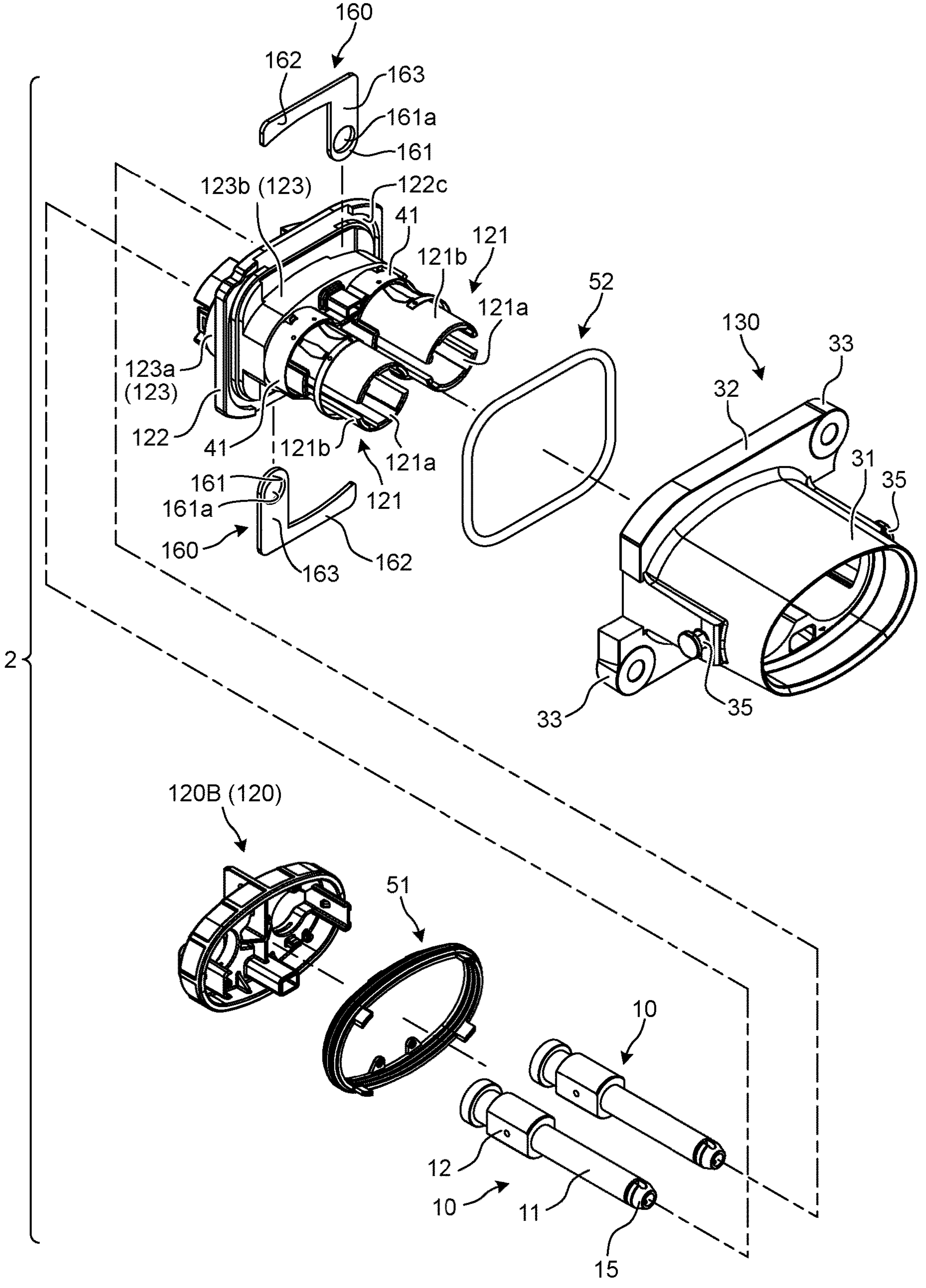
FIG. 11 is an exploded perspective view illustrating a connector according to a modification.

The connector 2 of the present modification corresponds to the connector 1 of the embodiment in which the housing 20, the shield shell 30, and the heat dissipation member 60 are respectively replaced with a housing 120, a shield shell 130, and a heat dissipation member 160 (FIG. 11). Therefore, in the drawing, members and the like equivalent to those included in the connector 1 of the embodiment are denoted by the same reference numerals as those of the connector 1 except the above. The shield shell 130 corresponds to the shield shell 30 of the embodiment in which points described later are changed. Therefore, in the shield shell 130 in the drawing, portions equivalent to or similar to those of the shield shell 30 of the embodiment are denoted by the same reference numerals as those of the embodiment.

The housing 120 of the present modification is formed of an insulating material such as synthetic resin and has an insulating property. The housing 120 includes a first housing member 120A corresponding to a member in which the first housing member 20A and the second housing member 20B in the housing 20 of the embodiment are formed as one member (FIGS. 11 to 14).

The first housing member 120A has a terminal accommodation portion 121, for each terminal fitting 10, in which a terminal accommodation chamber 121*a* is formed (FIGS.

Figure 12:
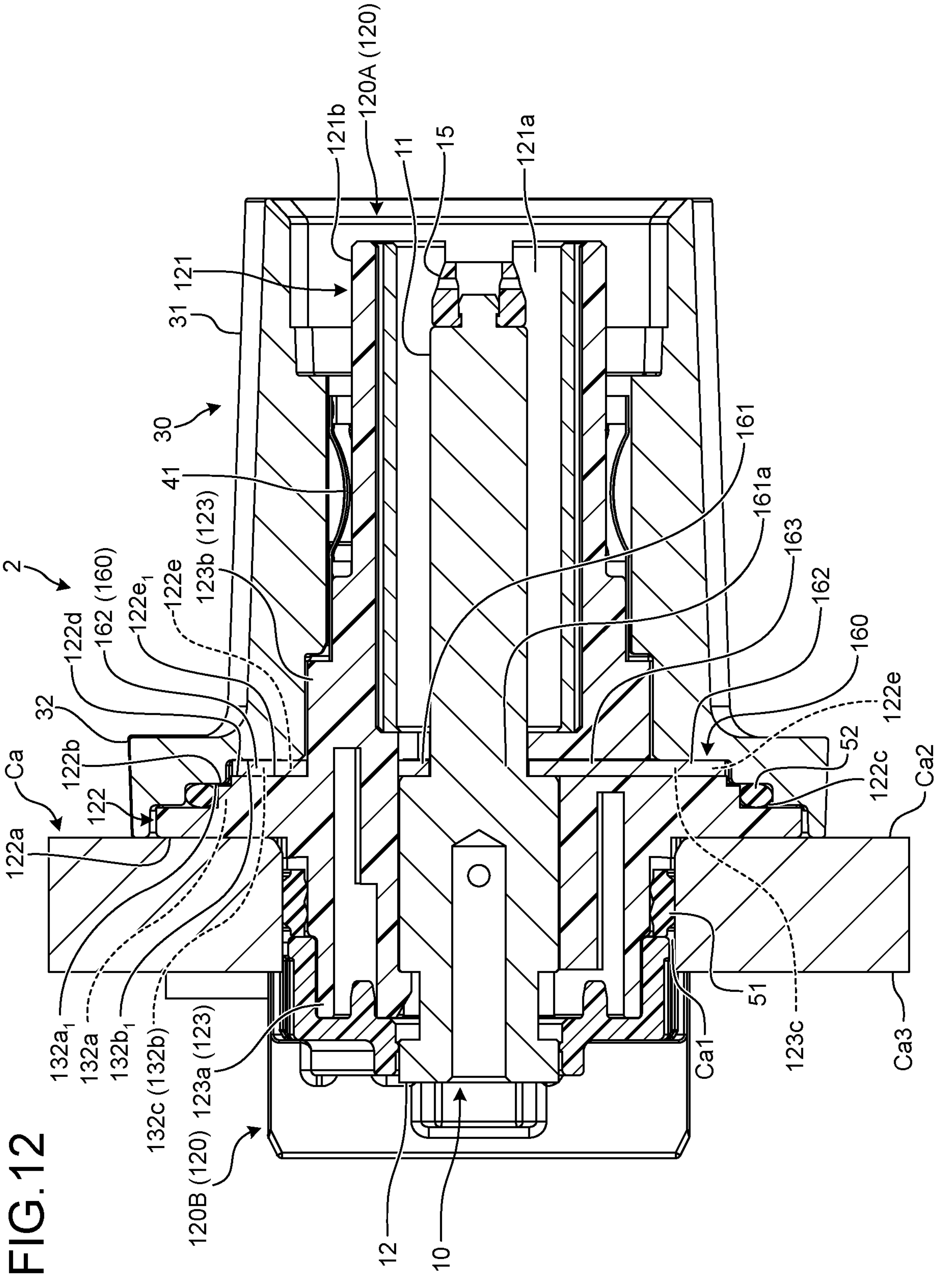
FIG. 12 is a cross-sectional view of the connector of the modification corresponding to FIG. 2.
Figure 13:
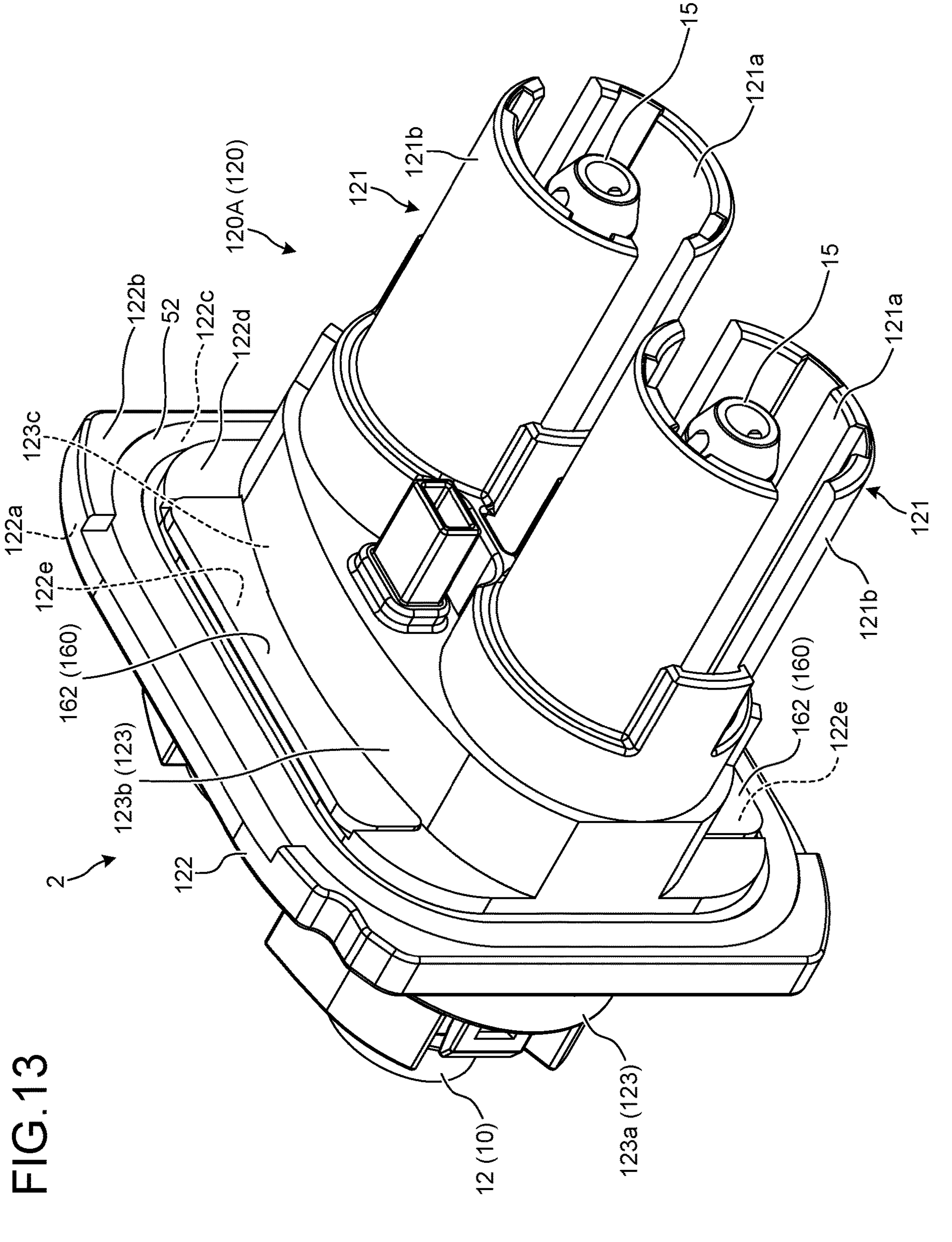
FIG. 13 is a perspective view illustrating a main part of a heat dissipation member of the connector according to the modification.

11 to 14). As in the terminal accommodation portion 21 of the embodiment, the terminal accommodation portion 121 has a fitting portion 121*b* to which the counterpart fitting portion 521*b* is fitted (FIGS. 11 to 13). In addition, the first housing member 120A includes a flange portion 122 which is the same as the flange portion 22 of the second housing member 20B of the embodiment, and a base portion 123 which is like a shape in which the base portion 23 of the first housing member 20A of the embodiment and the base portion 24 of the second housing member 20B of the embodiment are integrated (FIGS. 11 to 14).

In the first housing member 120A, a portion 123*a*, corresponding to the base portion 24 of the embodiment, of the base portion 123 is inserted into the through hole Ca1 of the casing Ca, and a second housing member 120B same as the third housing member 20C of the embodiment is assembled to a projecting portion from the wall face Ca3 of the casing Ca (FIGS. 11 and 12). In addition, as in the flange portion 22 of the embodiment, in the first housing member 120A, a first annular face 122*a* of the flange portion 122 comes into contact with the wall face Ca2 of the casing Ca, where the wall face Ca2 is opposite to the wall face Ca3, and a portion 123*b*, of the base portion 123, corresponding to the base portion 23 of the embodiment projects from a second annular face 122*b* of the flange portion 122, where the second annular face 122*b* is opposite the first annular face 122*a*, and the two terminal accommodation portions 121 are disposed ahead of the portion 123*b* (FIGS. 11 and 12).

In the flange portion 122, the second annular face 122*b* has an annular seal groove 122*c* which is the same as the annular seal groove 22*c* of the flange portion 22 of the embodiment (FIGS. 11 to 14).

The heat dissipation member 160 of the present modification has the same function as the heat dissipation member 60 of the embodiment, and comes into contact with the terminal fitting 10 in the terminal accommodation chamber 121*a* to dissipate heat taken from the terminal fitting 10. Therefore, as in the heat dissipation member 60 of the embodiment, the heat dissipation member 160 is formed of a raw material having higher thermal conductivity than the raw material of the housing 120.

As in the heat dissipation member 60 of the embodiment, the heat dissipation member 160 includes a heat absorbing portion 161 that comes into contact with the terminal fitting 10 in the terminal accommodation chamber 121*a* and takes heat from the terminal fitting 10, a heat transfer portion 162 that transfers the heat taken by the heat absorbing portion 161 to a heat transfer target portion (part of the shield shell 130) outside the terminal accommodation chamber 121*a*, and a coupling portion 163 that couples the heat absorbing portion 161 and the heat transfer portion 162 (FIGS. 11, 12, 14, and 15). The heat dissipation member 160 of the present modification is formed in a single flat plate shape in which all of the heat absorbing portion 161, the heat transfer portion 162, and the coupling portion 163 are disposed on the same plane. The heat dissipation member 160 illustrated here has an L shape, and the heat absorbing portion 161 and the coupling portion 163 are disposed on one piece of the L shape, and the other piece of the L shape is used as the heat transfer portion 162.

Figure 15:
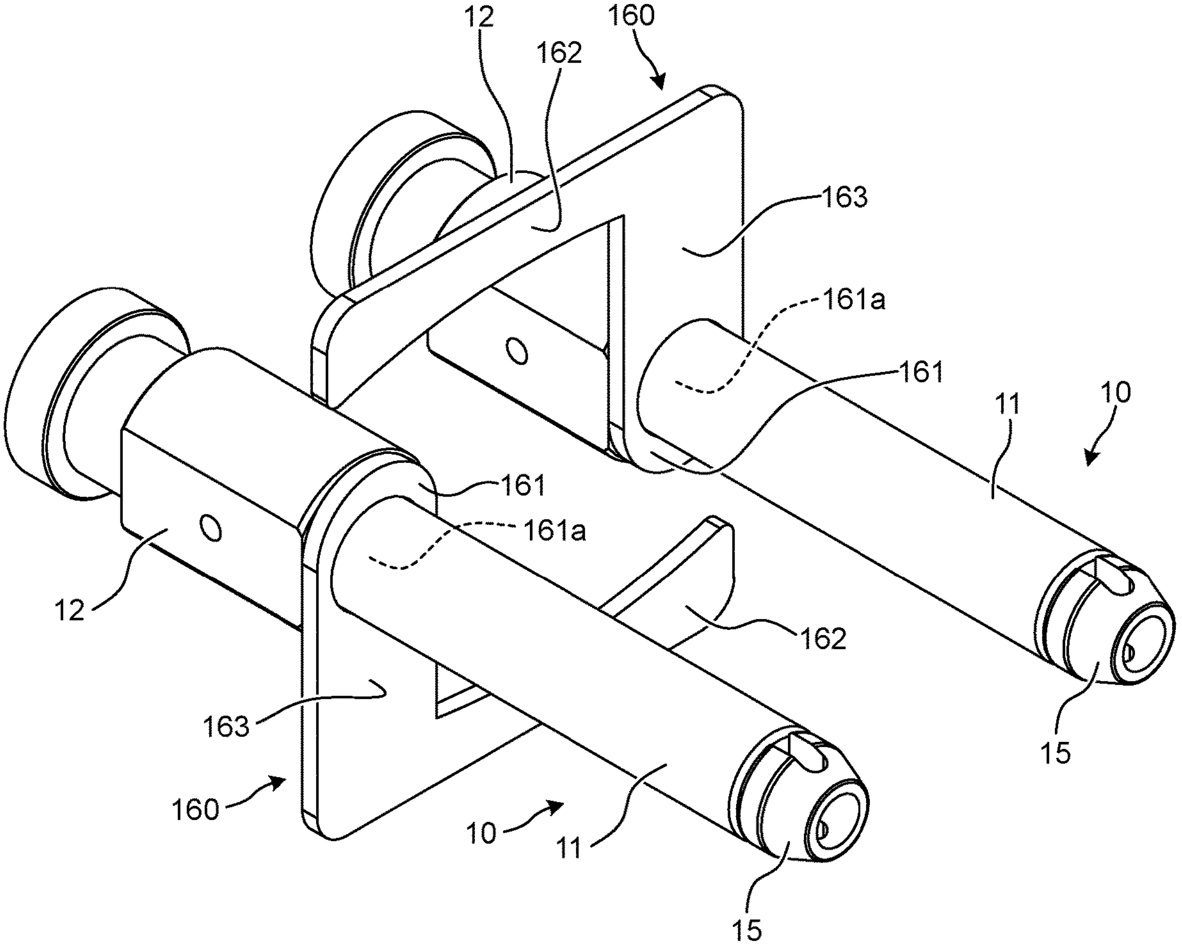
FIG. 15 is a perspective view for explaining an assembled state of the heat dissipation member and a terminal fitting according to the modification.

The heat absorbing portion 161 of the present modification has a through hole 161*a* into which the terminal fitting 10 is inserted and whose peripheral edge portion comes into contact with the outer peripheral face of the terminal fitting 10 (FIGS. 11, 12, and 15). That is, the heat absorbing portion 161 of the present modification is formed such that the peripheral edge portion of the through hole 161*a* comes into contact with the outer peripheral face of the terminal fitting 10 and the heat of the terminal fitting 10 is removed from the peripheral edge portion of the through hole 161*a*.

As described above, the terminal fitting 10 illustrated here includes the cylindrical terminal connection portion 11 and the cylindrical electric wire connection portion 12 which is concentric with the terminal connection portion 11 and has an outer diameter larger than that of the terminal connection portion 11. Therefore, the heat absorbing portion 161 may have the circular through hole 161*a* having a diameter generally equal to the outer diameter of the terminal connection portion 11. The heat absorbing portion 161 in this case takes heat from the terminal fitting 10 through the peripheral edge portion of the through hole 161*a* by inserting the terminal connection portion 11 into the through hole 161*a* and bringing the outer peripheral face of the terminal connection portion 11 into contact with the peripheral edge portion of the through hole 161*a*. In addition, the heat absorbing portion 161 may have the circular through hole 161*a* having a diameter generally equal to the outer diameter of the electric wire connection portion 12. The heat absorbing portion 161 in this case takes heat from the terminal fitting 10 through the peripheral edge portion of the through hole 161*a* by inserting the electric wire connection portion 12 into the through hole 161*a* and bringing the outer peripheral face of the electric wire connection portion 12 into contact with the peripheral edge portion of the through hole 161*a*. The electric wire connection portion 12 may have an exterior wall face 12*a* as in the embodiment, or may not have the exterior wall face 12*a*.

The heat absorbing portion 161 illustrated here has the circular through hole 161*a* having a diameter generally equal to the outer diameter of the terminal connection portion 11. Therefore, the heat absorbing portion 161 can use the end face of the electric wire connection portion 12 for positioning the heat dissipation member 160 by inserting the terminal connection portion 11 until the one plane comes into contact with the end face of the electric wire connection portion 12 toward the terminal connection portion 11.

As in the heat transfer portion 62 of the embodiment, the heat transfer portion 162 is disposed between the flange portion 122 of the housing 120 and the shield flange portion 32 of the shield shell 130, and transfers heat to the shield flange portion 32 by coming into contact with at least the shield flange portion 32. As in the heat transfer portion 62 of the embodiment, the heat transfer portion 162 is disposed on the long side portion of each of the flange portion 122 and the shield flange portion 32 and extends in the parallel direction (that is, in the longitudinal direction of the flange portion 122 and the shield flange portion 32) of the two terminal fittings 10.

Figure 14:
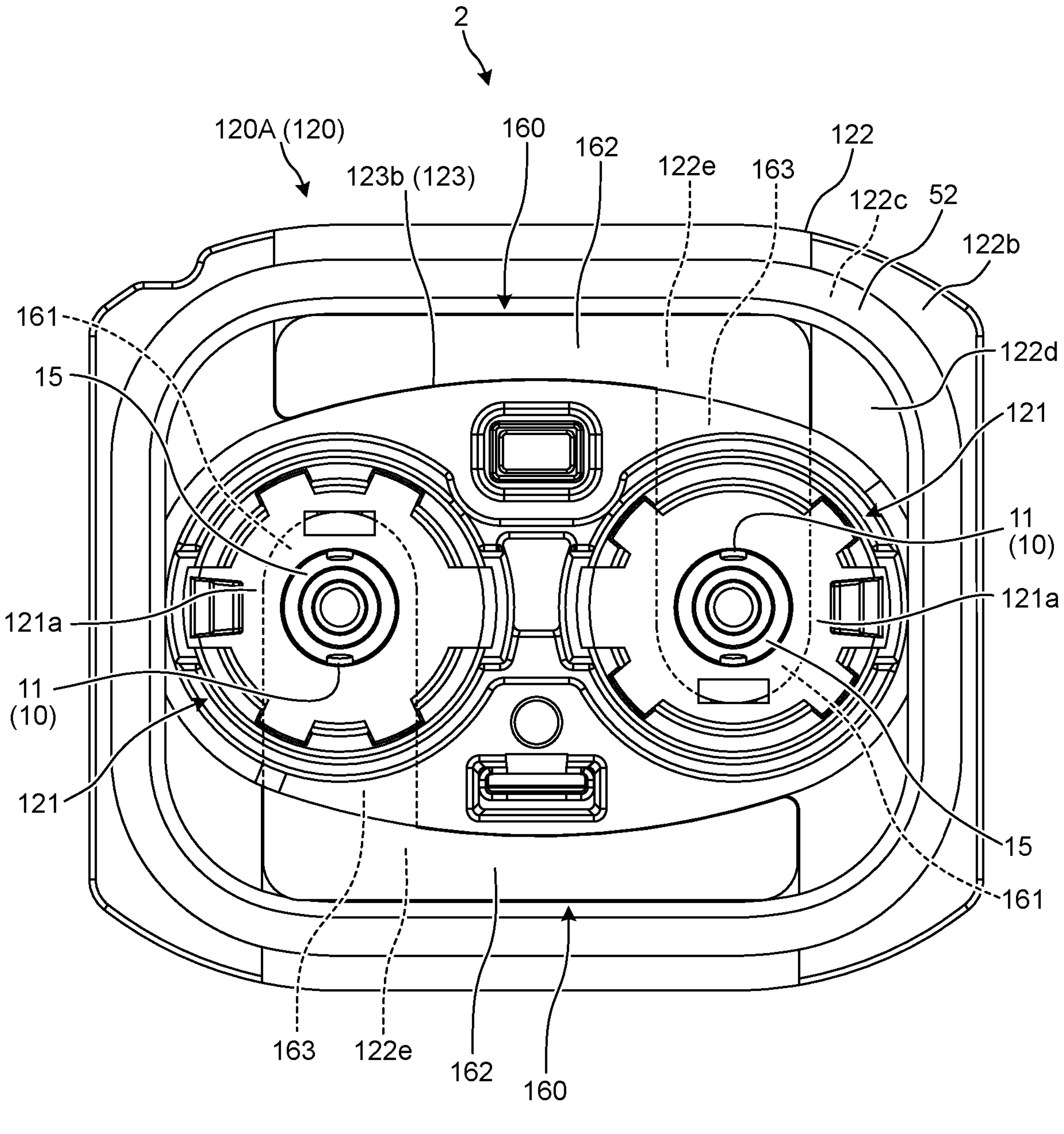
FIG. 14 is a plan view illustrating the main part of the heat dissipation member of the connector according to the modification.

The flange portion 122 illustrated here has a bulging portion 122*d* bulging out in a flat plate shape from the second annular face 122*b* inside the annular seal groove 122*c* (FIGS. 12 to 14). The bulging portion 122*d* has a fitting groove 122*e* into which the heat transfer portion 162 is fitted for each heat dissipation member 160 (FIGS. 12 to 14). The fitting groove 122*e* serves as a holding portion of the heat dissipation member 160 with respect to the housing 120 by holding the heat transfer portion 162 from both ends in the extending direction by the respective side walls.

Further, in the housing 120, the portion 123*b* of the base portion 123 corresponding to the base portion 23 of the embodiment communicates the outer and inner terminal accommodation chambers 121*a*, and a communication hole 123*c* communicating with the fitting groove 122*e* of the flange portion 122 is formed for each heat dissipation member 160 (FIGS. 12 and 13). The communication hole 123*c* is used as an insertion hole for inserting the heat absorbing portion 161 and the coupling portion 163 to the inner terminal accommodation chamber 121*a* from the outside at the time of assembling the heat dissipation member 160 to the housing 120.

In the connector 1, by inserting the heat absorbing portion 161 and the coupling portion 163 from the communication hole 123*c* and fitting the heat transfer portion 162 into the fitting groove 122*e*, the heat dissipation member 160 is held by the housing 120 in a state where the heat absorbing portion 161 is accommodated in the terminal accommodation chamber 121*a*. Thereafter, in the connector 1, while the terminal fitting 10 is inserted into the terminal accommodation chamber 121*a* from the terminal connection portion 11, the terminal connection portion 11 is inserted into the through hole 161*a* of the heat absorbing portion 161.

Figure 16:
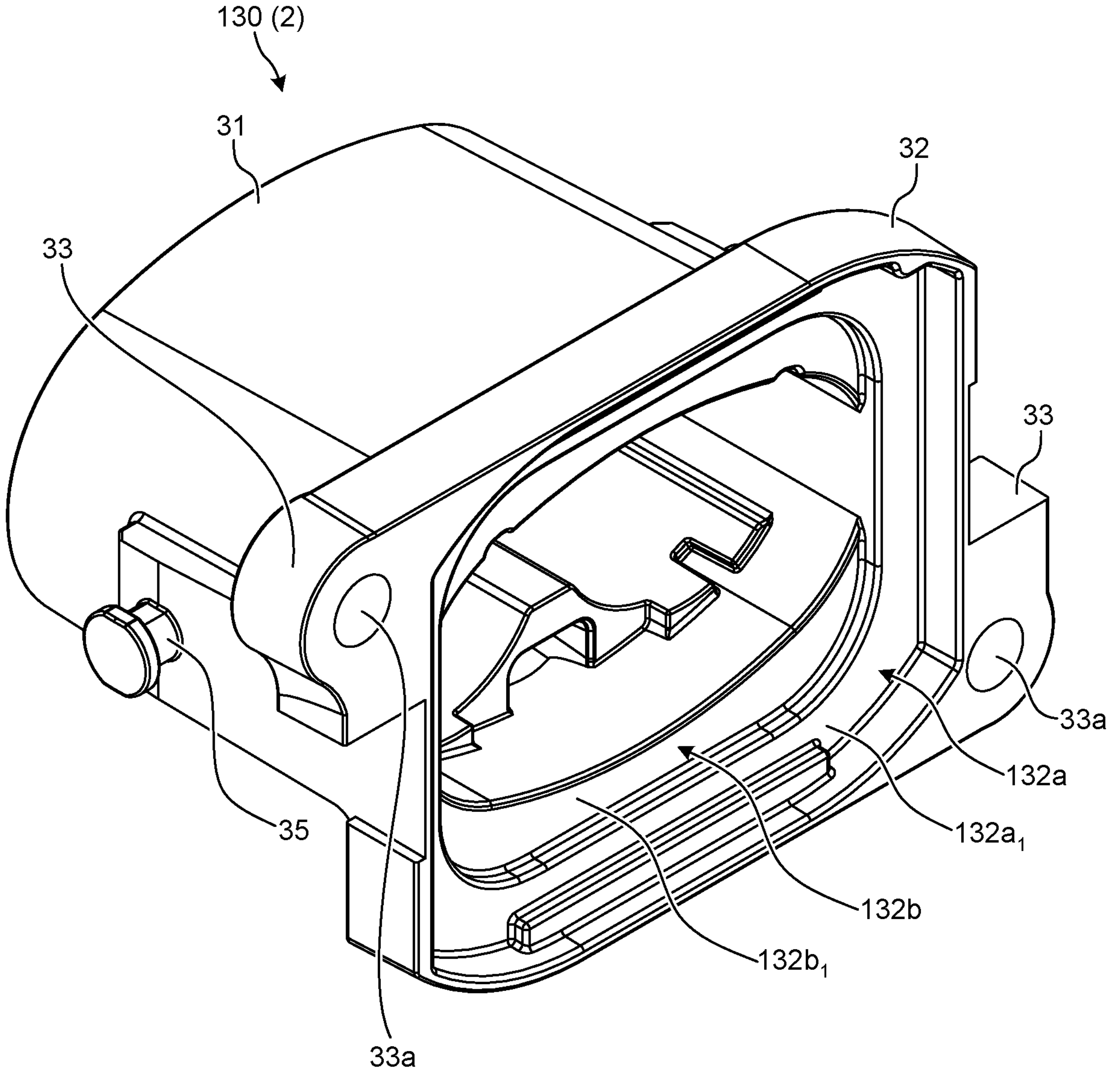
FIG. 16 is a perspective view illustrating a shield shell of the modification.

The shield shell 130 of the present modification is similar to the recess 32*a* of the shield shell 30 of the embodiment, but has a recess 132*a* formed in accordance with the shape of the flange portion 122 of the present modification in the shield flange portion 32 (FIGS. 12 and 16). The seal groove 122*c* of the flange portion 122 described above is formed at a wall face facing a wall face 132*ai* of the recess 132*a* of the second annular face 122*b* (FIGS. 12 and 16).

Further, the shield flange portion 32 includes an accommodation groove 132*b* that is a recess further recessed than the recess 132*a* at the inner peripheral face of the tubular shield portion 31, and that accommodates the bulging portion 122*d* of the flange portion 122 together with the heat transfer portion 162 of each heat dissipation member 160 (FIGS. 12 and 16). In the accommodation groove 132*b*, a groove bottom $\mathbf{132}b_1$ is disposed to face a groove bottom $\mathbf{122}e_1$ of the fitting groove 122*e* of the bulging portion 122*d* with a distance therebetween, and the heat transfer portion 162 is accommodated in a space between the groove bottoms $\mathbf{122}e_1$ and $\mathbf{132}b_1$ (FIGS. 12 and 16). The heat transfer portion 162 is accommodated in the space illustrated here in a state where respective planes come into contact with the groove bottoms $\mathbf{122}e_1$ and $\mathbf{132}b_1$. Therefore, this space is formed as a heat transfer chamber 132*c* that accommodates the heat transfer portion 162 in a state of coming into contact with the shield flange portion 32, and transfers the heat of the heat transfer portion 162 to at least the shield flange portion 32 (FIG. 12).

As in the connector 1 of the embodiment, in the connector 2 of the present modification, the heat of the terminal fitting 10 is transferred to the housing 120, transferred to the casing Ca and the shield shell 130 via the housing 120, and dissipated to the surrounding air. Further, as in the connector 1 of the embodiment, in the connector 2, the heat of the terminal fitting 10 transferred to the shield shell 130 is dissipated to the surrounding air through the counterpart housing 520 covering the tubular shield portion 31 from the outside. Further, as in the connector 1 of the embodiment, in the connector 2, when the temperature of the electric wire is lower, the heat of the terminal fitting 10 is transferred to the electric wire. In addition to such a heat transfer path that is the same as the conventional one, as in the connector 1 of the embodiment, in the connector 2 of the present modification, a heat transfer path via the heat dissipation member 160 is provided. Therefore, as in the connector 1 of the embodiment, the connector 2 of the present modification can enhance the heat dissipation performance of the terminal fitting 10 as compared with that of the related art, and can suppress the high temperature of the terminal fitting 10, so that it is possible to cope with an increase in current.

Further, as in the heat dissipation member 160 of the embodiment, the heat dissipation member 160 is accommodated in the connector by using a gap between the heat dissipation member and the terminal fitting 10 in the terminal accommodation chamber 121*a* or by using a chamber including a recess formed between the flange portion 122 and the shield flange portion 32. For this reason, as in the connector 1 of the embodiment, the connector 2 of the present modification can enhance the heat dissipation performance of the terminal fitting 10 as compared with that of the related art while suppressing the increase in size, so that it is possible to cope with the increase in current while maintaining the same size as that of the related art.

Furthermore, as in the heat dissipation member 160 of the embodiment, the heat transfer portion 162 of the heat dissipation member 160 is disposed inside the sealing member 52. Therefore, as in the connector 1 of the embodiment, the connector 2 of the present modification can enhance the heat dissipation performance of the terminal fitting 10 as compared with that of the related art without adversely affecting the waterproof property, so that it is possible to cope with an increase in current while maintaining the waterproof property equivalent to that of the related art.

Furthermore, as in the heat dissipation member 160 of the embodiment, the arrangement of the heat dissipation member 160 can be completed inside the shield shell 130. For this reason, as in the connector 1 of the embodiment, the connector 2 of the present modification can enhance the heat dissipation performance of the terminal fitting 10 as compared with that of the related art without adversely affecting the shielding performance, so that it is possible to cope with an increase in current while maintaining the shielding performance equivalent to that of the related art.

Furthermore, in the connector 2 of the present modification, in a case where the casing Ca includes the cooling structure and the like shown in the embodiment, as in the connector 1 of the embodiment, a larger amount of heat of the terminal fitting 10 can be taken away by the casing Ca cooled by the cooling structure and the like, so that it is possible to further cope with an increase in current.

In the connector according to the present embodiment, the heat of the terminal fitting is transferred to the housing, transferred to the casing or the like via the housing, and dissipated to the surrounding air. In the connector, when the temperature of the electric wire is lower, the heat of the terminal fitting is transferred to the electric wire. The connector according to the present embodiment has a heat transfer path via a heat dissipation member in addition to a heat transfer path that is the same as the conventional one. Therefore, the connector according to the present embodiment can improve the heat dissipation performance of the terminal fitting as compared with that of the related art, and can suppress the high temperature of the terminal fitting, so that it is possible to cope with an increase in current.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:

a terminal fitting;

an insulating housing having a terminal accommodation chamber in which the terminal fitting is accommodated, and attached to a casing of an installation target device; and an insulating heat dissipation member that takes heat from the terminal fitting and dissipates the heat, wherein the heat dissipation member includes a heat absorbing portion that comes into contact with the terminal fitting in the terminal accommodation chamber and takes heat from the terminal fitting, and a heat transfer portion that transfers the heat taken by the heat absorbing portion to a heat transfer target portion outside the terminal accommodation chamber, and the housing includes a fitting portion that has part of the terminal accommodation chamber inside the fitting portion and is disposed in a state of projecting from a wall face of the casing, and to which a counterpart fitting portion of a counterpart housing is fitted, and a flange portion that brings a first annular face in an axial direction into contact with the wall face of the casing and in which part of the terminal accommodation chamber is disposed, the heat transfer target portion is part of a metal shield shell including a tubular shield portion that accommodates the fitting portion, a shield flange portion that holds the flange portion between the shield flange portion and the wall face of the casing from a second annular face in the axial direction, the second annular face being opposite to the first annular face, and a fixing portion that fixes the shield flange portion to the casing, and a heat transfer chamber that accommodates the heat transfer portion with the heat transfer portion coming into contact with the shield flange portion is formed between the flange portion and the shield flange portion.

2. The connector according to claim 1, wherein the heat dissipation member is held by the housing.

3. The connector according to claim 2, wherein the heat absorbing portion comes into contact with an exterior wall face of the terminal fitting along an extending direction of the terminal fitting and the terminal accommodation chamber.

4. The connector according to claim 2, wherein the heat absorbing portion has a through hole into which the terminal fitting is inserted and whose peripheral edge portion comes into contact with an outer peripheral face of the terminal fitting.

5. The connector according to claim 1, wherein the housing includes a first housing member having the fitting portion and a second housing member having the flange portion and assembled to the first housing member, and the heat dissipation member is held by the first housing member and the second housing member.

6. The connector according to claim 5, wherein the heat absorbing portion comes into contact with an exterior wall face of the terminal fitting along an extending direction of the terminal fitting and the terminal accommodation chamber.

7. The connector according to claim 1, wherein the heat absorbing portion comes into contact with an exterior wall face of the terminal fitting along an extending direction of the terminal fitting and the terminal accommodation chamber.

8. The connector according to claim 1, wherein the heat absorbing portion has a through hole into which the terminal fitting is inserted and whose peripheral edge portion comes into contact with an outer peripheral face of the terminal fitting.

9. The connector according to claim 1, wherein along a longitudinal direction of the terminal fitting, the heat absorbing portion is longer than the heat transfer portion, and the longitudinal direction is perpendicular to the radial direction.

10. The connector according to claim 1, wherein in the radial direction away from the terminal fitting, an entirety of the insulating heat dissipation member is entirely positioned more outwardly than is the terminal fitting.

11. The connector according to claim 1, wherein, in the heat transfer chamber, the heat transfer portion is directly between the flange portion and the shield flange portion in the axial direction.

12. The connector according to claim 11, wherein the heat transfer chamber is in an annular recess in the shield flange portion.

13. The connector according to claim 1, wherein the heat dissipation member further comprises a coupling portion that couples the heat absorbing portion to the heat transfer portion.

14. A connector comprising:

a terminal fitting;

an insulating housing having a terminal accommodation chamber in which the terminal fitting is accommodated, and attached to a casing of an installation target device; and an insulating heat dissipation member that takes heat from the terminal fitting and dissipates the heat, wherein the heat dissipation member includes a heat absorbing portion that comes into contact with the terminal fitting in the terminal accommodation chamber and takes heat from the terminal fitting, and a heat transfer portion that transfers the heat taken by the heat absorbing portion to a heat transfer target portion outside the terminal accommodation chamber, and the heat absorbing portion has a through hole into which the terminal fitting is inserted and whose peripheral edge portion comes into contact with an outer peripheral face of the terminal fitting.

* * * * *